United States Patent
Cordeiro et al.

(10) Patent No.: US 9,173,221 B2
(45) Date of Patent: Oct. 27, 2015

(54) APPARATUS, SYSTEM AND METHOD OF ESTABLISHING A WIRELESS BEAMFORMED LINK

(71) Applicant: Intel Corporation, Santa Clara, CA (US)

(72) Inventors: Carlos Cordeiro, Portland, OR (US); Bahareh Sadeghi, Portland, OR (US); Alexander Maltsev, Nizhny Novgorod (RU); Vadim Sergeyev, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 265 days.

(21) Appl. No.: 13/870,085

(22) Filed: Apr. 25, 2013

(65) Prior Publication Data
US 2014/0206406 A1 Jul. 24, 2014

Related U.S. Application Data

(60) Provisional application No. 61/755,656, filed on Jan. 23, 2013.

(51) Int. Cl.
*H04B 1/00* (2006.01)
*H04B 15/00* (2006.01)
(Continued)

(52) U.S. Cl.
CPC ........... *H04W 72/046* (2013.01); *H04B 7/0617* (2013.01); *H04B 7/0619* (2013.01); *H04W 72/0413* (2013.01); *H04W 88/06* (2013.01); *Y02B 60/50* (2013.01)

(58) Field of Classification Search
USPC ............ 455/63.4, 25; 375/267; 342/367, 403, 342/423, 434, 437, 445; 370/334; 343/853
See application file for complete search history.

(56) References Cited

U.S. PATENT DOCUMENTS

| | | | |
|---|---|---|---|
| 8,718,537 B2 * | 5/2014 | Sakata et al. | 455/3.06 |
| 2007/0287384 A1 * | 12/2007 | Sadri et al. | 455/63.4 |

(Continued)

FOREIGN PATENT DOCUMENTS

| | | |
|---|---|---|
| KR | 2010-0035188 | 4/2010 |
| KR | 2012-0100895 | 9/2012 |
| TW | 201032511 | 9/2010 |

OTHER PUBLICATIONS

WiGig MAC and PHY Specification; Version 1.1; Apr. 2011—Final Specification. pp. 1-442.
(Continued)

*Primary Examiner* — Dominic E Rego
(74) *Attorney, Agent, or Firm* — Shichrur & Co.

(57) ABSTRACT

Some demonstrative embodiments include devices, systems and/or methods of establishing a wireless beamformed link. For example, an apparatus may include a wireless communication controller to control a first wireless communication device to communicate millimeter-wave (mmWave) signals with a second wireless communication device over a mmWave frequency band, the mmWave signals including signals transmitted according to a plurality of different transmit (Tx) beamforming settings, the wireless communication controller is to control the first wireless communication device to communicate feedback information, which is based on the mmWave signals, over a non-mmWave frequency band, and to control the first wireless communication device to establish with the second wireless communication device a beamformed link over the mmWave frequency band, the beamformed link using a Tx beamforming setting, which is determined based on the feedback information.

22 Claims, 6 Drawing Sheets

(51) Int. Cl.
 H04W 72/04 (2009.01)
 H04B 7/06 (2006.01)
 H04W 88/06 (2009.01)

(56) References Cited

U.S. PATENT DOCUMENTS

| | | | |
|---|---|---|---|
| 2008/0218413 A1* | 9/2008 | Li et al. | 342/367 |
| 2010/0156721 A1* | 6/2010 | Alamouti et al. | 342/367 |
| 2010/0254404 A1 | 10/2010 | Cordeiro et al. | |
| 2011/0182174 A1 | 7/2011 | Pi et al. | |
| 2012/0062411 A1* | 3/2012 | Shylo et al. | 342/94 |
| 2012/0213300 A1 | 8/2012 | Yamaura | |

OTHER PUBLICATIONS

IEEE Std 802.11™—2012 (Revision of IEEE Std 802.11-2007) IEEE Standard for Information technology—Telecommunications and information exchange between systems Local and metropolitan area networks—Specific requirements Part 11: Wireless LAN Medium Access Control (MAC) and Physical Layer (PHY) Specifications Mar. 29, 2012.

ETSI TS 136 300 V11.3.0 (Nov. 2012): LTE; Evolved Universal Terrestrial Radio Access (EUTRA) and Evolved Universal Terrestrial Radio Access Network (E-UTRA); Overall description; Stage 2 (3GPP TS 36.300 version 11.3.0 Release 11).

International Search Report and Written Opinion for PCT Patent Application No. PCT/US2014/012444, mailed on May 16, 2014, 13 pages.

International Preliminary Report on Patentability for International Patent Application No. PCT/US2014/012444, mailed on Aug. 6, 2015, 10 pages.

Office Action for Taiwanese Patent Application No. 103101266, Mailed on Sep. 9, 2015, 9 pages, including 1 page of English translation.

* cited by examiner

APPARATUS, SYSTEM AND METHOD OF ESTABLISHING A WIRELESS BEAMFORMED LINK

CROSS REFERENCE

This Application claims the benefit of and priority from U.S. Provisional Patent Application No. 61/755,656 entitled "Cellular-Assisted Millimeter Wave Beamforming", filed Jan. 23, 2013, the entire disclosure of which is incorporated herein by reference.

TECHNICAL FIELD

Embodiments described herein generally relate to establishing a wireless beamformed link.

BACKGROUND

Some wireless communication systems may communicate over the Millimeter wave (mmWave) frequency band, e.g., the 60 GHz Frequency band. The mmWave frequency band has a few major distinctive features in comparison with lower frequency bands, e.g., the frequency bands of 2.4-5 GHz. For example, the mmWave frequency band may have a propagation loss greater than the propagation loss in the lower frequency bands, and may have Quasi-optical propagation properties.

A mmWave communication system may use high-gain directional antennas to compensate for large path loss and/or employ beamsteering techniques. Design of appropriate antenna system and/or further signal processing may be an important aspect of mmWave communication system development.

Multi-element phased antenna arrays may be used, for example, for creation of a directional antenna pattern. A phased antenna array may form a directive antenna pattern or a directional beam, which may be steered by setting appropriate signal phases at the antenna elements.

A beamforming training procedure may be performed between two wireless communication devices to establish a wireless beamformed link between the two devices to communicate high-throughout data.

The beamforming training procedure may steer the directional beam of each of the two devices, such that the directional beam is directed towards the other device, for example, to enable high-throughput communication between the two devices.

The beamforming training procedure may require a relatively large amount of time and may consume a large amount of power.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
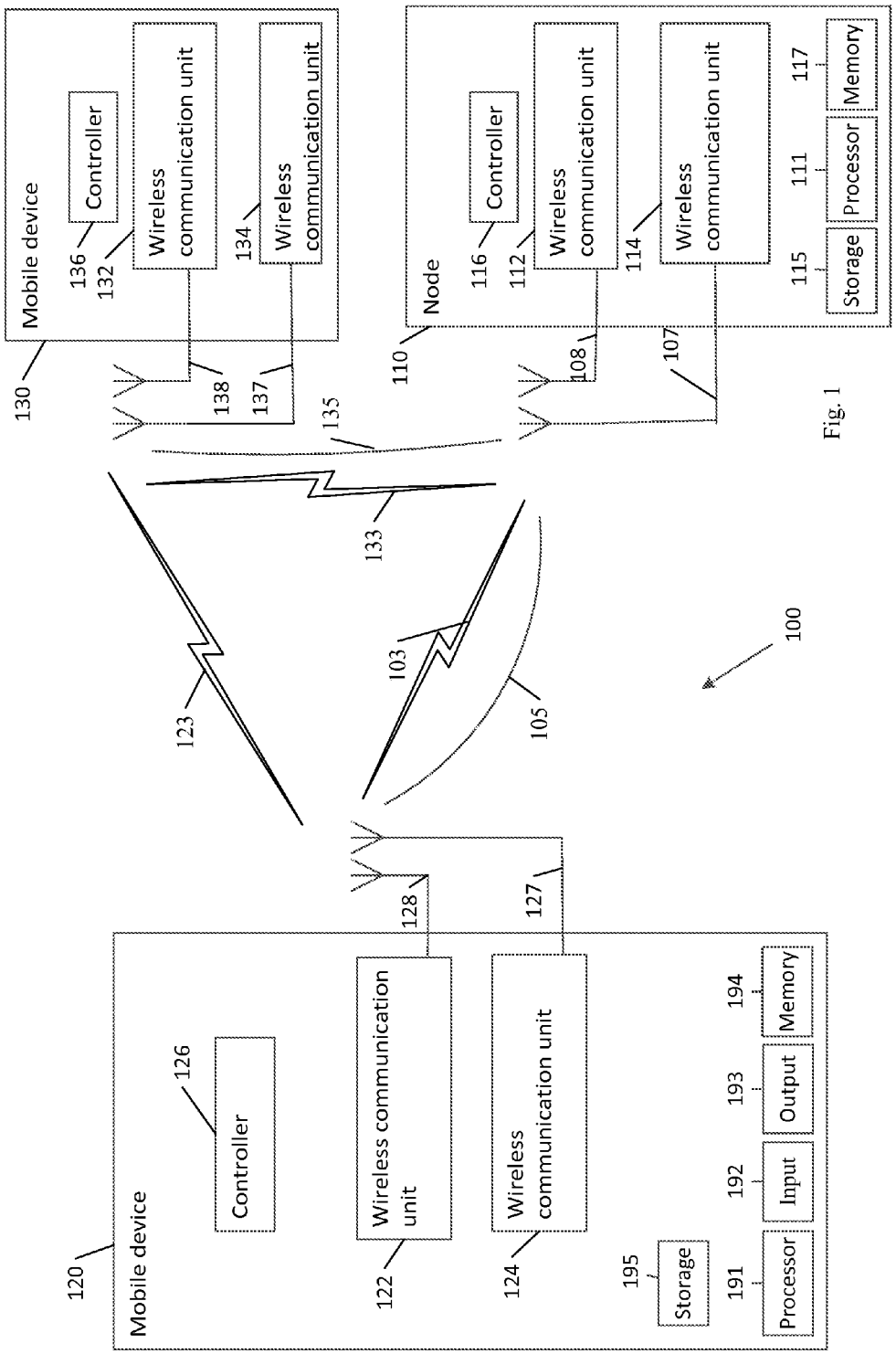
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11*: Wireless LAN Medium Access Control* (*MAC*) *and Physical Layer* (*PHY*) *Specifications, Mar.* 29, 2012*; IEEE*802.11 *task group ac* (*TGac*) ("*IEEE*802.11-09/030 8*r*12—*TGac Channel Model Addendum Document*"); *IEEE* 802.11 *task group ad* (*TGad*) (*IEEE P*802.11*ad Standard for Information Technology—Telecommunications and Information Exchange Between Systems—Local and Metropolitan Area Networks—Specific Requirements—Part* 11*: Wireless LAN Medium Access Control* (*MAC*) *and Physical Layer* (*PHY*) *Specifications—Amendment* 3*: Enhancements for Very High Throughput in the* 60 *GHz Band*)) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "mmWave frequency band" as used herein may relate to a frequency band above 20 GHz, e.g., a frequency band between 20 GHz and 300 GHz.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the mmWave or DMG band.

The term "beamforming", as used herein, may relate to a spatial filtering mechanism, which may be used at a transmitter and/or a receiver to improve one or more attributes, e.g., the received signal power or signal-to-noise ratio (SNR) at an intended receiver.

The term "cell", as used herein, may include a combination of network resources, for example, downlink and optionally uplink resources. The resources may be controlled and/or allocated, for example, by a wireless communication node (also referred to as a "node" or a "base station"), or the like. The linking between a carrier frequency of the downlink resources and a carrier frequency of the uplink resources may be indicated in system information transmitted on the downlink resources.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via a wireless medium (WM). For example, system 100 may include one or more wireless communication nodes, e.g., node 110, and one or more mobile devices, e.g., including mobile devices 120 and 130. The wireless medium may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, node 110, mobile device 120 and/or mobile device 130 may be configured to communicate over two wireless communication frequency bands. For example, node 110, mobile device 120 and/or mobile device 130 may communicate over a first frequency band and over a second frequency band, e.g., higher than the first frequency band.

In some demonstrative embodiments, the first frequency band may include a non-mmWave frequency band, and the second frequency band may include a mmWave frequency band.

In some demonstrative embodiments, node 110, mobile device 120 and/or mobile device 130 may be configured to communicate over the mmWave frequency band and over the non-mmWave frequency band.

In some demonstrative embodiments, the mmWave frequency band may include a Wireless-Gigabit (WiGig) frequency band.

In some demonstrative embodiments, the non-mmWave frequency band may include a broadband cellular frequency band.

In some demonstrative embodiments, the non-mmWave frequency band may include a Long-Term-Evolution (LTE) frequency band.

In other embodiments, node 110, mobile device 120 and mobile device 130 may be configured to communicate over any two different frequency bands.

In some demonstrative embodiments, node 110 may include or may perform the functionality of a Base Station (BS), an Access Point (AP), a WiFi node, a Wimax node, a cellular node, e.g., an Evolved Node B (eNB), a station, a hot spot, a network controller, and the like.

In some demonstrative embodiments, mobile devices 120 and/or 130 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, node 110, mobile device 120 and/or mobile device 130 may include one or more wireless communication units to perform wireless communication over the two wireless communication frequency bands between node 110, mobile device 120 and/or mobile device 130 and/or with one or more other wireless communication devices, e.g., as described below.

For example, node 110 may include a first wireless communication unit 112 configured to communicate over the mmWave frequency band, and a second wireless communication unit 114 configured to communicate over the non-mmWave frequency band; mobile device 120 may include a first wireless communication unit 122 configured to communicate over the mmWave frequency band, and a second wireless communication unit 124 configured to communicate over the non-mmWave frequency band; and/or mobile device 130 may include a first wireless communication unit 132 configured to communicate over the mmWave frequency band, and a second wireless communication unit 134 configured to communicate over the non-mmWave frequency band.

In some demonstrative embodiments, wireless communication units 112, 114, 122, 124, 132 and 134 may include, or may be associated with, one or more antennas. In one example, wireless communicate unit 112 may be associated with one or more antennas 108; wireless communicate unit 114 may be associated with one or more antennas 107; wireless communicate unit 122 may be associated with one or more antennas 128; wireless communicate unit 124 may be associated with one or more antennas 127; wireless communicate unit 132 may be associated with one or more antennas 138; and/or wireless communication unit 134 may be associated with one or more antennas 137.

Antennas 108, 107, 128, 127, 138 and/or 137 may include any type of antennas suitable for transmitting and/or receiving wireless communication signals, blocks, frames, transmission streams, packets, messages and/or data. For example, antennas 108, 107, 128, 127, 138 and/or 137 may include any suitable configuration, structure and/or arrangement of one or more antenna elements, components, units, assemblies and/or arrays. Antennas 108, 107, 128, 127, 138 and/or 137 may include, for example, antennas suitable for directional communication, e.g., using beamforming techniques. For example, antennas 108, 107, 128, 127, 138 and/or 137 may include a phased array antenna, a multiple element antenna, a set of switched beam antennas, and/or the like. In some embodiments, antennas 108, 107, 128, 127, 138 and/or 137 may implement transmit and receive functionalities using separate transmit and receive antenna elements. In some embodiments, antennas 108, 107, 128, 127, 138 and/or 137 may implement transmit and receive functionalities using common and/or integrated transmit/receive elements.

In some demonstrative embodiments, antennas 108, 128 and/or 138 may be suitable for communication over the mmWave frequency band. For example, antennas 108, 128 and/or 138 may include an antenna array, e.g., a phased antenna array, for communication over the WiGig frequency band.

In some demonstrative embodiments, antennas 107, 127 and/or 137 may be suitable for communication over the non-mmWave frequency band. For example, antennas 107, 127 and/or 137 may include an antenna suitable for communicating over the LTE frequency band.

In some demonstrative embodiments, mobile devices 120 and/or 130 may also include, for example, a processor 191, an input unit 192, an output unit 193, a memory unit 194, and a storage unit 195; and/or node 101 may also include, for example, one or more of a processor 111, a memory unit 117, and a storage unit 115. Node 101, mobile device 120 and/or mobile device 130 may optionally include other suitable hardware components and/or software components. In some demonstrative embodiments, some or all of the components of node 101, mobile device 120 and/or mobile device 130 may be enclosed in a common housing or packaging, and may be interconnected or operably associated using one or more wired or wireless links. In other embodiments, components of node 101 may be distributed among multiple or separate devices.

Processor 111 and/or processor 191 include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 111 executes instructions, for example, of an Operating System (OS) of node 110 and/or of one or more suitable applications.

Memory unit 117 and/or memory unit 194 include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 and/or storage unit 195 include, for example, a hard disk drive, a floppy disk drive, a Compact Disk (CD) drive, a CD-ROM drive, a DVD drive, or other suitable removable or non-removable storage units. For example, memory unit 117 and/or storage unit 115, for example, may store data processed by node 101.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, mobile device 120 and node 110 may establish a non-mmWave wireless communication link 105 for communication between mobile device 120 and node 110 over the non-mmWave frequency band. For example, mobile device 120 and node 110 may establish link 105, e.g., upon entering of mobile device 120 into a cell controlled by node 110.

In some demonstrative embodiments, mobile device 130 and node 110 may establish a non-mmWave wireless communication link 135 for communication between mobile device 130 and node 110 over the non-mmWave frequency band. For example, mobile device 130 and node 110 may establish link 135, e.g., upon entering of mobile device 130 into a cell controlled by node 110.

In some demonstrative embodiments, node 110, mobile device 120 and/or mobile device 130 may not be capable of establishing a wireless communication link over the mmWave frequency band. For example, mobile device 120 and node 110 may not be able to communicate with one another over a wireless communication link over the mmWave frequency band, e.g., if mobile device 120 and/or node 110 may not be capable of communicating over the mmWave frequency band.

In some demonstrative embodiments, node 110, mobile device 120 and/or mobile device 130 may not be capable of establishing a wireless communication link over the mmWave frequency band, for example, if wireless communication units 112, 122 and/or 132 may not work properly and/or may not support a communication over the mmWave frequency band. In other embodiments, node 110, mobile device 120 and/or mobile device 130 may not include a wireless communication unit for communicating over the mmWave frequency band, e.g., node 110, mobile device 120 and/or mobile device 130 may not include wireless communication units 112, 122 and/or 132.

In some demonstrative embodiments, node 110, mobile device 120 and/or mobile device 130 may not be capable of establishing a wireless communication link over the mmWave frequency band, for example, if one or more mmWave capabilities and/or requirements at node 110, mobile device 120 and/or mobile device 130 are not met and/or supported. For example, the mmWave capabilities may include supported transmission power levels, modulation orders, a number of antennas, a number of antenna elements per antenna of the antennas, a beamforming capability and/or the like.

For example, mobile device 120 and node 110 may be capable of establishing a wireless communication link over the mmWave frequency band between node 110 and device 120, for example, if device 120 and node 110 support the same modulation order, e.g., if both device 120 and node 110 support at least one common modulation order of a binary phase-shift keying (BPSK) modulation, a quadrature phase-shift keying (QPSK) modulation, a 16 quadrature amplitude modulation (16-QAM) modulation, a 64-QAM modulation and the like.

In one example, a Transmit (Tx) side, e.g., one device of node 110 and mobile device 120, and a Receive (Rx) side, e.g., another device of node 110 and mobile device 120, may be considered to be capable of establishing a wireless communication link over the mmWave frequency band between node 110 and device 120, for example, if a difference between a sum of a supported transmit power of the Tx side, a transmitter antenna gain of the Tx side and a receiver antenna gain of the Rx side, and between a sum of a path-loss corresponding to a communication typical range and apparatus implementation losses, exceeds a minimum receiver sensitivity corresponding to a particular modulation order supported by both the Tx and Rx sides.

In some demonstrative embodiments, mobile device 120 and mobile device 130 may not be able to communicate with one another over the mmWave frequency band, for example, if mobile devices 120 and 130 are not located within a mmWave coverage area of one another.

In some demonstrative embodiments, node 110, mobile device 120 and/or mobile device 130 may utilize the communication over the non-mmWave frequency band to communicate over the mmWave frequency band.

In some demonstrative embodiments, node 110, mobile device 120 and/or mobile device 130 may utilize the communication over the non-mmWave frequency band to determine whether or not node 110, mobile device 120 and/or mobile device 130 are capable of establishing a wireless communication link over the mmWave frequency band, e.g., as described below.

In some demonstrative embodiments, a device of node 110, mobile device 120 and/or mobile device 130 may include a wireless communication controller to control a first wireless communication device of node 110, mobile device 120 and/or mobile device 130 to communicate capability information over the non-mmWave frequency band.

In some demonstrative embodiments, the capability information may include information indicating a capability of communicating between the first wireless communication device and a second, e.g., different, wireless communication device of node 110, mobile device 120 and/or mobile device 130 over the mmWave frequency band.

In some demonstrative embodiments, the communication controller may control the first wireless communication device to establish a mmWave link between the first and second wireless communication devices over the mmWave frequency band based on the capability information, e.g., as described below.

In some demonstrative embodiments, node 110 may include a wireless communication controller 116 configured to control wireless communication unit 114 to communicate capability information over the non-mmWave frequency band, e.g., via antennas 107.

In some demonstrative embodiments, mobile device 120 may include a wireless communication controller 126 configured to control wireless communication unit 124 to communicate capability information over the non-mmWave frequency band, e.g., via antennas 127.

In some demonstrative embodiments, controller 116 may control wireless communication unit 114 to communicate capability information between node 110 and mobile device 120, e.g., via non-mmWave link 105; and to establish a mmWave link 103 between node 110 and mobile device 120 based on the capability information.

In some demonstrative embodiments, controller 126 may control wireless communication unit 124 to communicate capability information between mobile device 120 and node 110, e.g., via non-mmWave link 105; and to establish link 103 between node 110 and mobile device 120 based on the capability information.

In one example, node 110 and mobile device 120 may communicate the capability information over link 105, e.g., before establishing link 103. Node 110 and mobile device 120 may establish link 103, for example, if the capability information indicates that both node 110 and mobile device 120 are capable of establishing a wireless communication link over the mmWave frequency band.

In some demonstrative embodiments, mobile device 130 may include a wireless communication controller 136 configured to control wireless communication unit 134 to communicate capability information over the non-mmWave frequency band, e.g., via antennas 137.

In some demonstrative embodiments, controller 136 may control wireless communication unit 134 to communicate capability information between mobile device 130 and node 110, e.g., via non-mmWave link 135; and to establish a mmWave link 133 between node 110 and mobile device 130 based on the capability information.

In some demonstrative embodiments, controller 116 may control wireless communication unit 114 to communicate capability information between node 110 and mobile device 130, e.g., via non-mmWave link 135; and to establish link 133 between node 110 and mobile device 130 based on the capability information.

In one example, node 110 and mobile device 130 may communicate capability information over link 135, e.g., before establishing link 133. Node 110 and mobile device 130 may establish link 133, for example, if the capability information indicates that both node 110 and mobile device 130 are capable of establishing a wireless communication link over the mmWave frequency band.

In some demonstrative embodiments, controller 116 may control wireless communication unit 114 to communicate capability information between node 110 and mobile devices 120 and 130; and to control mobile devices 120 and 130 to establish a mmWave link 123 between mobile device 120 and mobile device 130 based on the capability information.

In some demonstrative embodiments, node 110 may be utilized as a moderator to communicate at least part of the capability information between mobile devices 120 and 130, e.g., via links 135 and 105.

In one example, node 110 and mobile device 120 may communicate, e.g., via link 105, capability information with respect to mobile device 120, e.g., before establishing link 123.

In some demonstrative embodiments, node 110 and mobile device 130 may communicate via link 135 capability information with respect to mobile device 130, e.g., before establishing link 123.

In some demonstrative embodiments, node 110 may control mobile device 120 and mobile device 130 to establish link 123, for example, if the capability information with respect to mobile devices 120 and 130 indicates that both mobile devices 130 and 120 are capable of establishing a wireless communication link over the mmWave frequency band.

In some demonstrative embodiments, links 103, 123 and/or 133 may include a direct link, e.g., a P2P link, for example, to enable direct communication between node 110, mobile device 120 and/or mobile device 130.

In some demonstrative embodiments, node 110, mobile device 120 and/or mobile device 130 may perform the functionality of mmWave STAs, e.g., DMG stations ("DMG STA"). For example, node 110, mobile device 120 and/or mobile device 130 may be configured to communicate over the DMG band.

In some demonstrative embodiments, links 103, 123 and/or 133 may include a wireless beamformed link.

In some demonstrative embodiments, links 103, 123 and/or 133 may include a wireless gigabit (WiGig) link. For example, links 103, 123 and/or 133 may include a wireless beamformed link over the 60 GHZ frequency band.

In some demonstrative embodiments, the capability information may include capability information with respect to the first wireless communication device and/or capability information with respect to the second wireless communication device.

In one example, the capability information communicated between node 110 and mobile device 120, e.g., before establishing link 103, may include capability information with respect to node 110 and/or capability information with respect to mobile device 120.

In another example, the capability information communicated between node 110 and mobile device 120 and between node 110 and mobile device 130, e.g., before establishing link 123, may include capability information with respect to mobile device 120 and/or capability information with respect to mobile device 130.

In some demonstrative embodiments, the capability information with respect to a device may include a capability of the device to communicate over the mmWave frequency band, e.g., whether the device includes a mmWave communication module.

In some demonstrative embodiments, the capability information of the device may also include whether the device includes a mmWave communication module, one or more supported transmission power levels of the device, one or more modulation orders of the device, a number of antennas of the device, a number of antenna elements per antenna of the device, and/or a beamforming capability of the device.

In one example, the capability information communicated between node 110 and mobile device 120 may include capability information with respect to node 110, e.g., whether node 110 includes a mmWave communication module, e.g., wireless communication unit 112, supported transmission power levels of node 110, one or more modulation orders of node 110, a number of antennas of antennas 108, a number of antenna elements per antenna of antennas 108, and/or a beamforming capability of wireless communication unit 112; and/or capability information with respect to mobile device 120, e.g., whether device 120 includes a mmWave communication module, e.g., wireless communication unit 122, supported transmission power levels of device 120, one or more modulation orders of device 120, a number of antennas of antennas 128, a number of antenna elements per antenna of antennas 128, and/or a beamforming capability of wireless communication unit 122.

In another example, the capability information communicated between node 110 and mobile device 120, e.g., via link 105, and/or between node 110 and mobile device 130, e.g., via link 135, to establish link 123, may include the capability information with respect to mobile device 120; and/or capability information with respect to mobile device 130, e.g., whether device 130 includes a mmWave communication module, e.g., wireless communication unit 132, supported transmission power levels of device 130, one or more modulation orders of device 130, a number of antennas of antennas 138, a number of antenna elements per antenna of antennas 138, and/or a beamforming capability of wireless communication unit 132.

In some demonstrative embodiments, the capability information with respect to a device may include location information corresponding to a location of the device.

In one example, the capability information communicated between node 110 and mobile device 120 may include location information corresponding to a location of node 110, e.g., a location Fix of node 110; and/or location information corresponding to a location of mobile device 120, e.g., a location Fix of mobile device 120.

In one example, the capability information communicated between node 110 and mobile device 120 may include location information corresponding to a location of node 110, e.g., a location Fix of node 110; and/or location information corresponding to a location of mobile device 120, e.g., a location Fix of mobile device 120.

In another example, the capability information communicated between node 110 and mobile device 120, and between node 110 and mobile device 130, e.g., before establishing link 123, may include location information corresponding to a location of device 120, e.g., a location Fix of device 120; and/or location information corresponding to a location of mobile device 130, e.g., a location Fix of mobile device 130.

In some demonstrative embodiments, the first and the second wireless communication devices may establish the mmWave link based on the capability information.

In some demonstrative embodiments, the first and the second wireless communication devices may establish the mmWave link, for example, if one or more requirements for establishing the mmWave link are met.

In some demonstrative embodiments, the first wireless communication device and/or the second wireless communication device may determine if the requirements are met based on the capability information.

In some demonstrative embodiments, the requirements may include a requirement that the first and second wireless communication devices have a mmWave communication module; support a required modulation order, which supports the mmWave frequency band; a distance between the first and second wireless communication devices, which is lesser than a predefined distance, e.g., such that the first and second wireless communication devices are within a coverage range of each other and/or any other requirements based on the capability information, e.g., as described above.

In one example, node 110 and mobile device 120 may communicate, e.g., before establishing link 103, e.g., via link 105, capability information including whether node 110 and/or device 120 include a mmWave communication module, e.g., wireless communication units 112 and/or 122; the transmission power levels of node 110 and/or device 120; the modulation orders of node 110 and/or device 120; the number of antennas of antennas 108 and/or 208; the number of antenna elements per antenna of antennas 108 and/or 208; the beamforming capability of wireless communication units 112 and/or 122; and/or the location information corresponding to the location of mobile device 120 and/or node 110.

In some demonstrative embodiments, node 110 and mobile device 120 may establish link 103 based on the capability information communicated before establishing link 103.

For example, node 110 and mobile device 120 may establish link 103, for example, if node 110 and device 120 include a mmWave communication module, e.g., wireless communication units 112 and/or 122, the modulation orders of node 110 and device 120 support the same mmWave modulation order, and/or the distance between node 110 and mobile device 120 is lesser than the predefined distance.

In some demonstrative embodiments, node 110 and/or mobile device 120 may utilize the capability information corresponding to node 110 and/or device 120 for establishing link 103, e.g., as described below.

In some demonstrative embodiments, node 110 and/or mobile device 120 may utilize the capability information corresponding to node 110 and/or device 120 for performing beamforming training between mobile device 120 and node 110.

In some demonstrative embodiments, node 110 and/or mobile device 120 may utilize the capability information corresponding to node 110 and/or device 120 to configure preliminary beamforming settings of antennas 108 and/or 128 for performing the beamforming training between mobile device 120 and node 110.

In some demonstrative embodiments, node 110 and/or mobile device 120 may utilize the location information corresponding to node 110 and/or mobile device 120 and an orientation of mobile device 120 to configure the preliminary beamforming settings of antennas 108 and/or 128.

In some demonstrative embodiments, node 110 and/or mobile device 120 may configure the preliminary beamforming settings of antennas 108 and/or 128, such that antennas 108 and 128 may form a directional beam at an estimated direction towards each other.

In one example, controller 116 may estimate a relative location of mobile device 120 with respect to node 110, e.g., based on the location information corresponding to device 120. Controller 116 may configure the beamforming settings of antennas 108 to initiate the beamforming training in a direction directed to the estimated location of mobile device 120.

In some demonstrative embodiments, controller 126 may estimate a relative location of node 110 with respect to mobile device 120, e.g., based on the location information corresponding to node 110.

In some demonstrative embodiments, controller 126 may estimate an orientation of antennas 128 of mobile device 120, e.g., utilizing a compass of mobile device 120, a gyroscope of mobile device 120, and/or any other devices and or methods of estimating the orientation of antennas 128. Controller 126 may configure the beamforming settings of antennas 128 to initiate the beamforming training in a direction directed to the relative location of node 110 based on the relative location of node 110 and the orientation of antennas 128 of device 120.

In some demonstrative embodiments, mobile device 130 and/or mobile device 120 may utilize the capability information corresponding to mobile devices 120 and 130, which may be communicated with node 110 for establishing link 123, e.g., as described below.

In some demonstrative embodiments, mobile device 130 and/or mobile device 120 may utilize the capability information corresponding to mobile devices 120 and 130 to configure preliminary beamforming settings of antennas 128 and/or 138 for performing beamforming training between mobile devices 120 and 130.

In some demonstrative embodiments, mobile device 130 and/or mobile device 120 may configure the preliminary beam forming settings of antennas 138 and/or 128, such that antennas 138 and 128 may form a directional beam towards each other.

In some demonstrative embodiments, controller 126 may estimate a relative location of mobile device 130 with respect to mobile device 120, e.g., based on the location information corresponding to mobile device 130.

In some demonstrative embodiments, controller 126 may estimate an orientation of antennas 128 of mobile device 120. Controller 126 may configure the beamforming settings of antennas 128 to initiate the beamforming training in a direction directed to the relative location of node 110 based on the relative location of node 110 and the orientation of device 120 and/or a relative direction of link 105.

In some demonstrative embodiments, controller 136 may estimate the relative location of mobile device 120 with respect to mobile device 130, e.g., based on the location information corresponding to mobile device 120.

In some demonstrative embodiments, controller 136 may estimate an orientation of antennas 138 of mobile device 130, e.g., based on a compass of mobile device 130, a gyroscope of mobile device 130, and/or any other devices and or methods of estimating the orientation of antennas 138. Controller 136 may configure the beamforming settings of antennas 138 to initiate the beamforming training in a direction directed to the relative location of node 110 based on the relative location of node 110 and the orientation of device 120 and/or based on a relative direction of link 135.

In some demonstrative embodiments, node 110, mobile device 120 and/or mobile device 130 may utilize the non-mmWave frequency band for establishing links 103, 123 and/or 133.

In some demonstrative embodiments, node 110, mobile device 120 and/or mobile device 130 may utilize links 105 and/or 135 for communicating information corresponding to the beamforming training between node 110, mobile device 120 and/or mobile device 130, e.g., as described below.

In one example, node 110, mobile device 120 and/or mobile device 130 may utilize links 105 and/or 135 for performing the beamforming training, for example, after configuring the preliminary beamforming settings of antennas 108, 128 and/or 138.

In another example, node 110, mobile device 120 and/or mobile device 130 may utilize links 105 and/or 135 for performing the beamforming training, for example, after determining a capability of node 110, mobile device 120 and/or mobile device 130 to communicate over the mmWave frequency band.

In some demonstrative embodiments, a controller of controllers 116, 126 and 136 may control a first wireless communication device of node 110, mobile device 120 and mobile device 130 to communicate mmWave signals over a mmWave frequency band with a second, e.g., different, wireless communication device of node 110, mobile device 120 and mobile device 130.

In some demonstrative embodiments, the mmWave signals may include signals transmitted according to a plurality of different transmit (Tx) beamforming settings.

In some demonstrative embodiments, the mmWave signals may include beamforming training signals.

In some demonstrative embodiments, the controller may control the first wireless communication device to communicate feedback information, which is based on the mmWave signals, over the non-mmWave frequency band.

In some demonstrative embodiments, the feedback information may include signal quality feedback including one or more signal quality metrics corresponding to the plurality of Tx beamforming settings.

In some demonstrative embodiments, the feedback information may include an indication of the Tx beamforming setting to be used for the beamformed link.

In some demonstrative embodiments, the controller may control the first wireless communication device to establish with the second wireless communication device a beamformed link over the mmWave frequency band. The beamformed link may use a Tx beamforming setting, which is determined based on the feedback information.

In some demonstrative embodiments, the controller may control the first wireless communication device to transmit the mmWave signals to the second wireless communication device according to the plurality of Tx beamforming settings.

In some demonstrative embodiments, the controller may receive the feedback information from the second wireless communication device over the non-mmWave frequency band.

In some demonstrative embodiments, the controller may determine the Tx beamforming settings based on the received feedback information, and may use the Tx beamforming setting for transmitting to the second wireless communication device over the beamformed link.

In some demonstrative embodiments, the controller may control the first wireless communication device to receive the mmWave signals transmitted from the second wireless communication device according to the plurality of Tx beamforming settings.

In some demonstrative embodiments, the controller may control the first wireless communication device to transmit the feedback information over the non-mmWave frequency band, and to receive over the beamformed link signals transmitted by the second wireless communication device using the Tx beamforming setting, which is based on the feedback information.

In some demonstrative embodiments, the first wireless communication device may include node 110 and the second wireless communication device may include a mobile device of mobile devices 120 and 130. Node 110 and the mobile device may utilize a non-mmWave link between node 110 and the mobile device to establish a mmWave between node 110 and the mobile device, e.g., as described below with reference to FIG. 2.

In one example, the first wireless communication device may include node 110 and the second wireless communication device may include mobile device 130. Node 110 and mobile device 130 may utilize link 135 to establish link 133, e.g., as described below.

In some demonstrative embodiments, controller 116 may control wireless communication unit 112 to transmit the beamforming training signals to mobile device 130, e.g., via antennas 108, according to a plurality of different TX beamforming settings of antennas 108.

In some demonstrative embodiments, controller 136 may control wireless communication unit 132 to receive the beamforming training signals.

In some demonstrative embodiments, controller 136 may control wireless communication unit 134 to transmit feedback information to node 110 via link 135. The feedback information may include an indication of a Tx beamforming setting of antennas 108. For example, the indication may indicate a Tx beamforming setting having increased, e.g., best, signal quality metrics with respect to other Tx beamforming settings of antennas 108.

In some demonstrative embodiments, controller 116 may control wireless communication unit 114 to receive the feedback information from mobile device 130 via link 135.

In some demonstrative embodiments, controller 116 may control wireless communication unit 112 to use the Tx beamforming setting for transmitting to device 130 over link 133. For example, controller 116 may adjust beamforming settings of antennas 108 according to the Tx beamforming settings to transmit to device 130 over link 133.

In some demonstrative embodiments, the first wireless communication device may include a mobile device of mobile devices 120 and 130 and the second wireless communication device may include node 110. Node 110 and the mobile device may utilize a non-mmWave link between node 110 and the mobile device to establish a mmWave between node 110 and the mobile device, e.g., as described below with reference to FIG. 3.

In one example, the first wireless communication device may include mobile device 120 and the second wireless communication device may include node 110. Node 110 and mobile device 120 may utilize link 105 to establish link 103, e.g., as described below.

In some demonstrative embodiments, controller 126 may control wireless communication unit 122 to transmit the beamforming training signals, e.g., via antennas 128, to node 110 according to a plurality of different TX beamforming settings of antennas 128.

In some demonstrative embodiments, controller 116 may control wireless communication unit 112 to receive the beamforming training signals.

In some demonstrative embodiments, controller 116 may control wireless communication unit 114 to transmit feedback information to mobile device 120 via link 105. The feedback information may include an indication of a Tx beamforming setting of antennas 128. For example, the indication may indicate a Tx beamforming setting having increased, e.g., best, signal quality metrics with respect to the other Tx beamforming settings of antennas 128.

In some demonstrative embodiments, controller 126 may control wireless communication unit 124 to receive the feedback information from node 110 via link 105.

In some demonstrative embodiments, controller 126 may control wireless communication unit 122 to use the Tx beamforming setting for transmitting to node 110 over link 103. For example, controller 126 may adjust beamforming settings of antennas 128 according to the Tx beamforming setting to transmit to node 110 over link 103.

In some demonstrative embodiments, the first wireless communication device may include a device of mobile devices 120 and 130 and the second wireless communication device may include other, e.g., different, device of mobile devices 120 and 130. According to these embodiment, controller 116 may control mobile devices 120 and 130 to establish link 123, e.g., as described below with reference to FIG. 4.

In one example, the first wireless communication device may include mobile device 120 and the second wireless communication device may include mobile device 130. Controller 116 may control devices 120 and 130 to utilize links 105 and 135 to communicate information, e.g., via node 110, to establish link 123, e.g., as described below.

In some demonstrative embodiments, controller 116 may control wireless communication unit 114 to transmit to mobile device 120 via link 105 an instruction to transmit the beamforming training signals to mobile device 130 according to the plurality of different TX beamforming settings of antennas 128.

In some demonstrative embodiments, controller 116 may control wireless communication unit 114 to transmit to mobile device 130 via link 135 an instruction to receive the beamforming training signals transmitted by device 120.

In some demonstrative embodiments, controller 136 may control wireless communication unit 134 to transmit feedback information to node 110 via link 135. The feedback information may include an indication of a Tx beamforming setting of antennas 128. For example, the indication may indicate a Tx beamforming setting of antennas 128 having increased, e.g., best, signal quality metrics with respect to the other Tx beamforming settings of antennas 128.

In some demonstrative embodiments, controller 116 may control wireless communication unit 114 to receive the feedback information from mobile device 130 via link 135.

In some demonstrative embodiments, controller 116 may control wireless communication unit 114 to transmit to mobile device 120 via link 105 an instruction to use the Tx beamforming setting of antennas 128 received from mobile device 130, for transmitting to device 130 over link 123.

In some demonstrative embodiments, controller 126 may control wireless communication unit 122 to use the Tx beamforming setting of antennas 128 received from mobile device 130. For example, controller 126 may adjust beamforming settings of antennas 128 according to the Tx beamforming settings to transmit to device 130 over link 123.

In some demonstrative embodiments, utilizing the non-mmWave frequency band to establish mmWave beamformed links, e.g., as described above, may reduce the time to establish the mmWave beamformed links. Accordingly, a power consumption and network throughput of a mobile device may be improved.

In some demonstrative embodiments, node 110, mobile device 120 and/or mobile devices 130 may utilize links 103, 123 and/or 133 for data communication between mobile device 120 and mobile devices 130, for example, since links 103, 123 and/or 133 may enable high-throughput data transfer, e.g., compared to links 105, 125 and/or 125.

In some demonstrative embodiments, control information corresponding to links 103, 123 and/or 133, e.g., a link adaptation, error control, beamforming adjustments, signal quality feedback and/or the like may be communicated via links 103, 123 and/or 133.

In other embodiments, the control information may be communicated via the non-mmWave frequency band. For example, the mmWave frequency band may be utilized only for data transfer.

Figure 2:
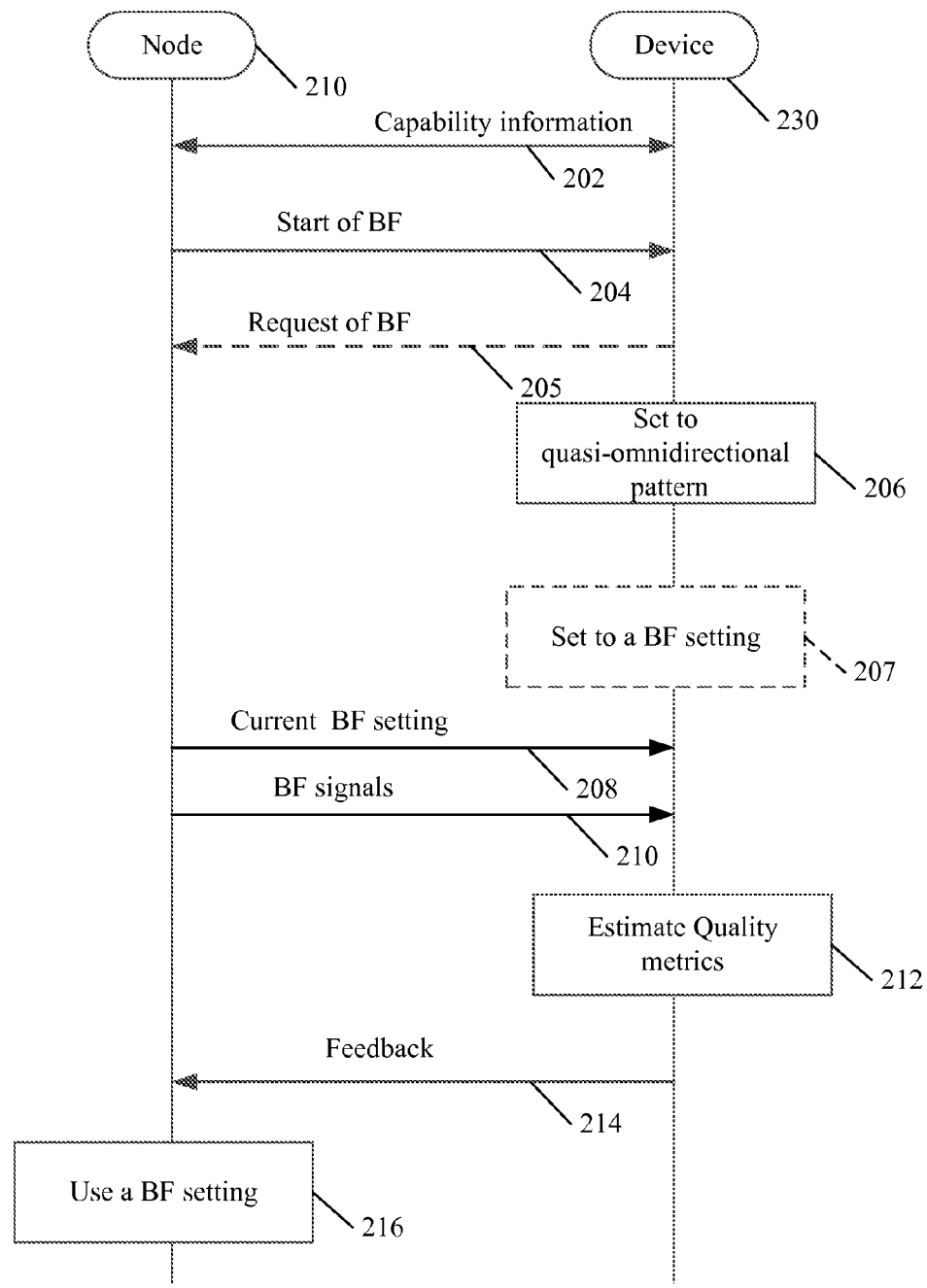
FIG. 2 is a schematic illustration of a sequence of operations between a wireless communication node and a mobile device, in accordance with some demonstrative embodiments.

Reference is made to FIG. 2, which schematically illustrates a sequence of operations between a wireless communication node 210 and a mobile device 230, in accordance with some demonstrative embodiments. For example, wireless communication node 210 may perform the functionality of node 110 (FIG. 1); and/or mobile device 230 may perform the functionality of mobile device 120 and/or mobile device 130 (FIG. 1).

As shown in FIG. 2, node 210 and device 230 may communicate capability information 202 over a non-mmWave link to determine whether to establish a mmWave link. For example, node 110 (FIG. 1) and mobile device 130 (FIG. 1) may determine to establish link 133 (FIG. 1) based on the capability information communicated via link 135 (FIG. 1), e.g., as described above.

As shown in FIG. 2, node 210 may inform (204) device 230 over the non-mmWave link of a start of a beamforming training procedure between node 210 and device 230, for example, if both node 210 and device 230 are capable of communicating over the mmWave frequency band. For example, node 110 (FIG. 1) may inform mobile device 130 (FIG. 1) of a start of the beamforming training procedure to establish link 123 (FIG. 1), for example, if both node 110 (FIG. 1) and device 120 (FIG. 1) are capable of communicating over the mmWave frequency band, e.g., as described above.

Alternatively, as shown in FIG. 2, device 230 may request (205) from node 210 over the non-mmWave link to perform the beamforming training procedure between node 210 and device 230. For example, mobile device 130 (FIG. 1) may request node 110 (FIG. 1) to perform the beamforming training procedure to establish link 123 (FIG. 1), e.g., as described above.

As shown in FIG. 2, device 230 may configure (206) antennas of device 230, e.g., an antenna array, to apply a quasi-omnidirectional pattern. For example, device 130 (FIG. 1) may configure antennas 138 (FIG. 1) to apply the quasi-omnidirectional pattern.

Alternatively, as shown in FIG. 2, device 230 may utilize (207) a beamforming setting of the antenna array of device 230, for example, if the beamforming setting of device 230 is previously configured, and/or a direction of node 210 with respect to device 230 is known. Accordingly, device 230 may select a most suitable sector and/or beamforming setting for the beamforming training procedure. For example, device 130 (FIG. 1) may configure a beamforming setting of antennas 138, for example, if the beamforming setting of antenna 138 (FIG. 1) are previously configured and/or based on the relative location of node 110 (FIG. 1) and device 130 (FIG. 1), e.g., as described above.

As shown in FIG. 2, node 210 may inform (208) device 230 over the non-mmWave link of a beamforming setting being currently used, e.g., at a given time period, of a plurality of different Tx beamforming settings. For example, node 210 may inform device 230 of a sector number of an antenna array of node 210, which is currently being used for the beamforming training procedure. For example, node 110 (FIG. 1) may inform mobile device 130 (FIG. 1) over link 135 (FIG. 1) of a beamforming setting of the plurality of Tx beamforming settings of antennas 108 (FIG. 1), which is currently being used, and/or a sector of antennas 108 (FIG. 1), which is currently being used.

Alternatively, a predefined sequence of the Tx beamforming settings and/or sectors of the antennas of node 210 may be utilized, for example, if device 230 is aware of and/or informed about the predefined sequence of beamforming settings and/or sectors.

As shown in FIG. 2, node 210 may transmit (210) mmWave signals, e.g., beamforming training signals, to device 230 over the mmWave frequency band according to the plurality of different Tx beamforming settings, or according to the predefined sequence. For example, wireless communication unit 112 (FIG. 1) may transmit to device 130 (FIG. 1) the beamforming training signals according to the plurality of different TX beamforming settings of antennas 108 (FIG. 1).

As shown in FIG. 2, device 230 may receive the beamforming training signals, and may estimate (212) a signal quality metric for each beamforming setting of the Tx beamforming settings. The signal quality metric may include a Received Signal Strength Indicator (RSSI), a Signal to Interference plus Noise Ratio (SINR), and/or any other quality metric. For example, device 130 (FIG. 1) may receive the beamforming training signals transmitted from node 110 (FIG. 1) and may estimate for each beamforming setting of the TX beamforming settings of antennas 108 (FIG. 1) a quality metric, e.g., as described above.

As shown in FIG. 2, device 230 may transmit (214) to node 210 over the non-mmWave link feedback information indicating a beamforming setting of the plurality of Tx beamforming settings of the antennas of node 210. The feedback information may include, for example, an index of a most suitable sector of the antennas of node 210, a most suitable beamforming setting of the antennas of node 210, and/or the quality metrics for each beamforming setting of the different Tx beamforming settings. For example, mobile device 130 (FIG. 1) may transmit via link 125 the feedback information to node 110 (FIG. 1) including the indication of the Tx beamforming setting of antennas 108 (FIG. 1), e.g., as described above.

As shown in FIG. 2, node 210 may select (216) the beamforming setting, e.g., based on the feedback information, may configure the antennas of node 210 according to the beamforming setting, and may use the beamforming setting to transmit to mobile device 230 via the mmWave link. For example, controller 116 (FIG. 1) may select the Tx beamforming setting and may control wireless communication unit 112 (FIG. 1) to use the Tx beamforming setting for transmitting to device 130 (FIG. 1) over link 133 (FIG. 1), e.g., as described above.

Figure 3:
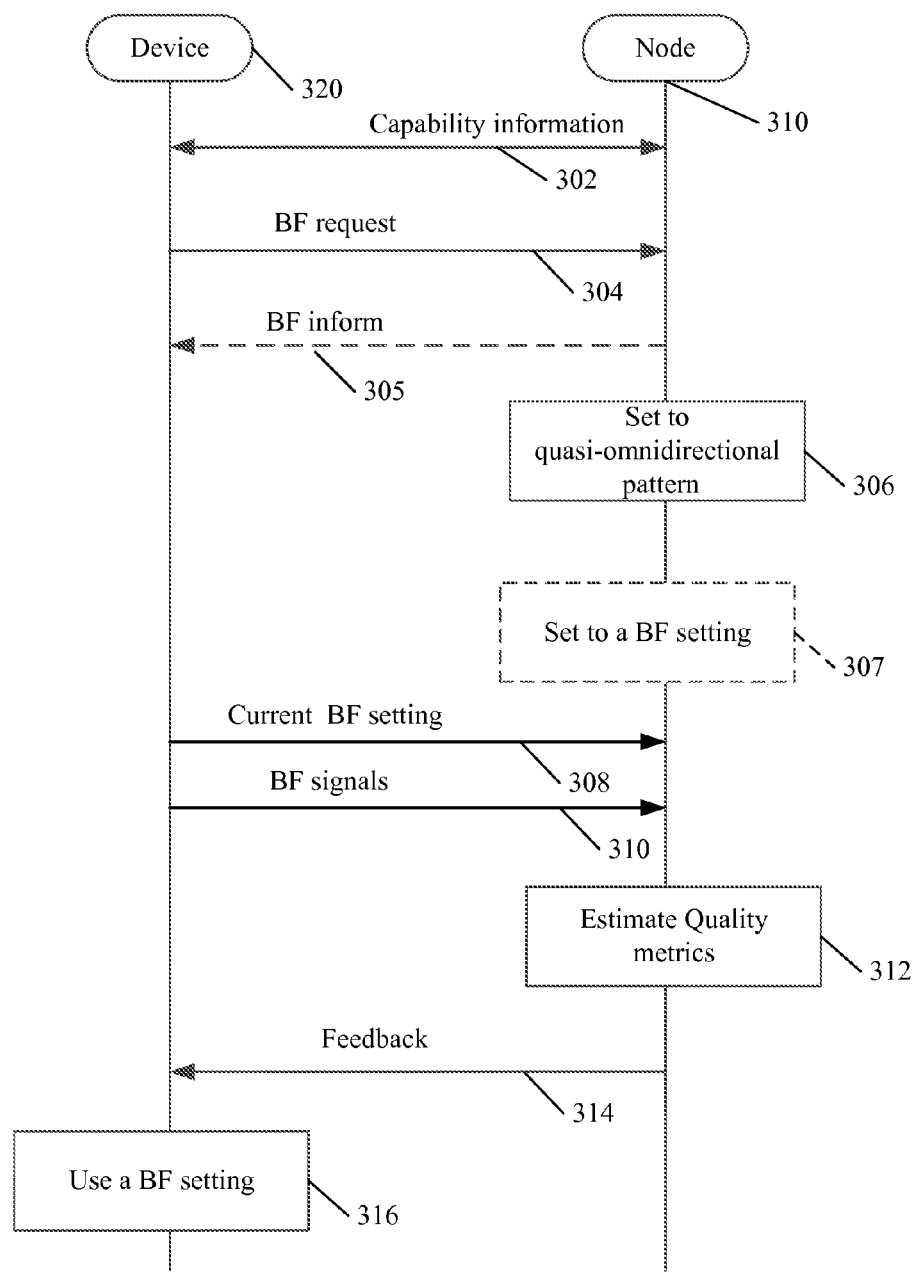
FIG. 3 is a schematic illustration of a sequence of operations between a mobile device and a wireless communication node, in accordance with some demonstrative embodiments.

Reference is made to FIG. 3, which schematically illustrates a sequence of operations between a wireless communication node 310 and a mobile device 320, in accordance with some demonstrative embodiments. For example, wireless communication node 310 may perform the functionality of node 110 (FIG. 1); and/or mobile device 320 may perform the functionality of mobile device 120 and/or mobile device 130 (FIG. 1).

As shown in FIG. 3, node 310 and device 320 may communicate capability information 302 over a non-mmWave link to determine whether to establish a mmWave link. For example, node 110 (FIG. 1) and mobile device 120 (FIG. 1) may determine to establish link 103 (FIG. 1) based on the capability information communicated via link 105 (FIG. 1), e.g., as described above.

As shown in FIG. 3, device 320 may request (304) from node 310 over the non-mmWave link to perform the beamforming training procedure between node 310 and device 320. For example, mobile device 120 (FIG. 1) may request node 110 (FIG. 1) to perform the beamforming training procedure to establish link 103 (FIG. 1), e.g., as described above.

Alternatively, As shown in FIG. 3, node 310 may inform (305) device 320 over the non-mmWave link of a start of a beamforming training procedure between node 310 and device 320, for example, if both node 310 and device 320 are capable of communicating over the mmWave frequency band. For example, node 110 (FIG. 1) may inform mobile device 120 (FIG. 1) of a start of the beamforming training procedure to establish link 103 (FIG. 1), for example, if both node 110 (FIG. 1) and device 120 (FIG. 1) are capable of communicating over the mmWave frequency band, e.g., as described above.

As shown in FIG. 3, node 310 may configure (306) antennas of node 310, e.g., an antenna array, to apply a quasi-omnidirectional pattern. For example, node 110 (FIG. 1) may configure antennas 108 (FIG. 1) to apply the quasi-omnidirectional pattern.

Alternatively, as shown in FIG. 3, node 310 may utilize (307) a beamforming setting of the antenna array of node 310, for example, if the beamforming settings of node 310 are previously configured, and/or a direction of node 310 with respect to mobile device 320 is known. Accordingly, node 310 may select a most suitable sector and/or beamforming setting for the beamforming training procedure. For example, node 110 (FIG. 1) may configure a beamforming setting of antennas 108 (FIG. 1), for example, if the beamforming settings of antennas 108 (FIG. 1) are previously configured and/or based on the relative location of node 110 (FIG. 1) and device 120 (FIG. 1), e.g., as described above.

As shown in FIG. 3, device 320 may inform (308) node 310 over the non-mmWave link of a beamforming setting being currently used, e.g., at a given time period, of a plurality of different Tx beamforming settings. For example, device 320 may inform node 310 a sector number of the antenna array of device 320, which is currently being used for the beamforming training procedure. For example, mobile device 120 (FIG. 1) may inform node 110 (FIG. 1) over link 135 (FIG. 1) of a beamforming setting of the plurality of different Tx beamforming settings of antennas 128 (FIG. 1), which is currently being used, and/or a sector of antennas 108 (FIG. 1), which is currently being used.

Alternatively, a predefined sequence of the Tx beamforming settings and/or sectors of the antennas of device 320 may be utilized, for example, if node 310 is aware of and/or informed about the predefined sequence of beamforming settings and/or sectors.

As shown in FIG. 3, device 320 may transmit (310) mmWave signals, e.g., beamforming training signals, to node 310 over the mmWave frequency band according to the plurality of different Tx beamforming settings, or according to the predefined sequence. For example, wireless communication unit 122 (FIG. 1) may transmit to node 110 (FIG. 1) the beamforming training signals according to the plurality of different TX beamforming settings of antennas 128 (FIG. 1).

As shown in FIG. 3, node 310 may receive the beamforming training signals, and may estimate (312) a signal quality metric for each beamforming setting of the different Tx beamforming settings. The signal quality metric may include the RSSI, the SINR, and/or any other quality metric. For example, node 110 (FIG. 1) may receive the beamforming training signals transmitted from device 120 (FIG. 1) and may estimate for each beamforming setting of the different Tx beamforming settings of antennas 128 (FIG. 1) a quality metric, e.g., as described above.

As shown in FIG. 3, node 310 may transmit (314) to mobile device 320 over the non-mmWave link feedback information indicating a beamforming setting of the plurality of Tx beamforming settings of the antennas of mobile device 320. The feedback information may include, for example, an index of a most suitable sector of the antennas of mobile device 320, a most suitable beamforming setting of the antennas of mobile device 320, and/or the quality metrics for each beamforming setting of the different Tx beamforming settings. For example, node 110 (FIG. 1) may transmit via link 105 the feedback information to mobile device 120 (FIG. 1) including the indication of the Tx beamforming setting of antennas 128 (FIG. 1), e.g., as described above.

As shown in FIG. 3, mobile device 320 may select (316) the beamforming setting, e.g., based on the feedback information, may configure the antennas of mobile device 320 according to the beamforming setting, and may use the beamforming setting to transmit to node 110 via the mmWave link. For example, controller 126 (FIG. 1) may select the Tx beamforming setting and may control wireless communication unit 122 (FIG. 1) to use the Tx beamforming setting for transmitting to node 110 (FIG. 1) via link 103 (FIG. 1), e.g., as described above.

In some demonstrative embodiments, the sequence of operations described above with reference to FIGS. 2 and 3 may be utilized for establishing a mmWave link between a wireless communication node and a wireless mobile device, e.g., as described above. In other embodiments, the sequence of operations described above with reference to FIGS. 2 and 3 may be utilized for establishing a mmWave link between two wireless mobile devices, for example, if the two devices have a direct connection between them over the non-mmWave frequency band. In one example, a first device of the two devices may perform the functionality of the wireless communication node and a second device of the two devices may perform the functionality of the mobile device.

Figure 4:
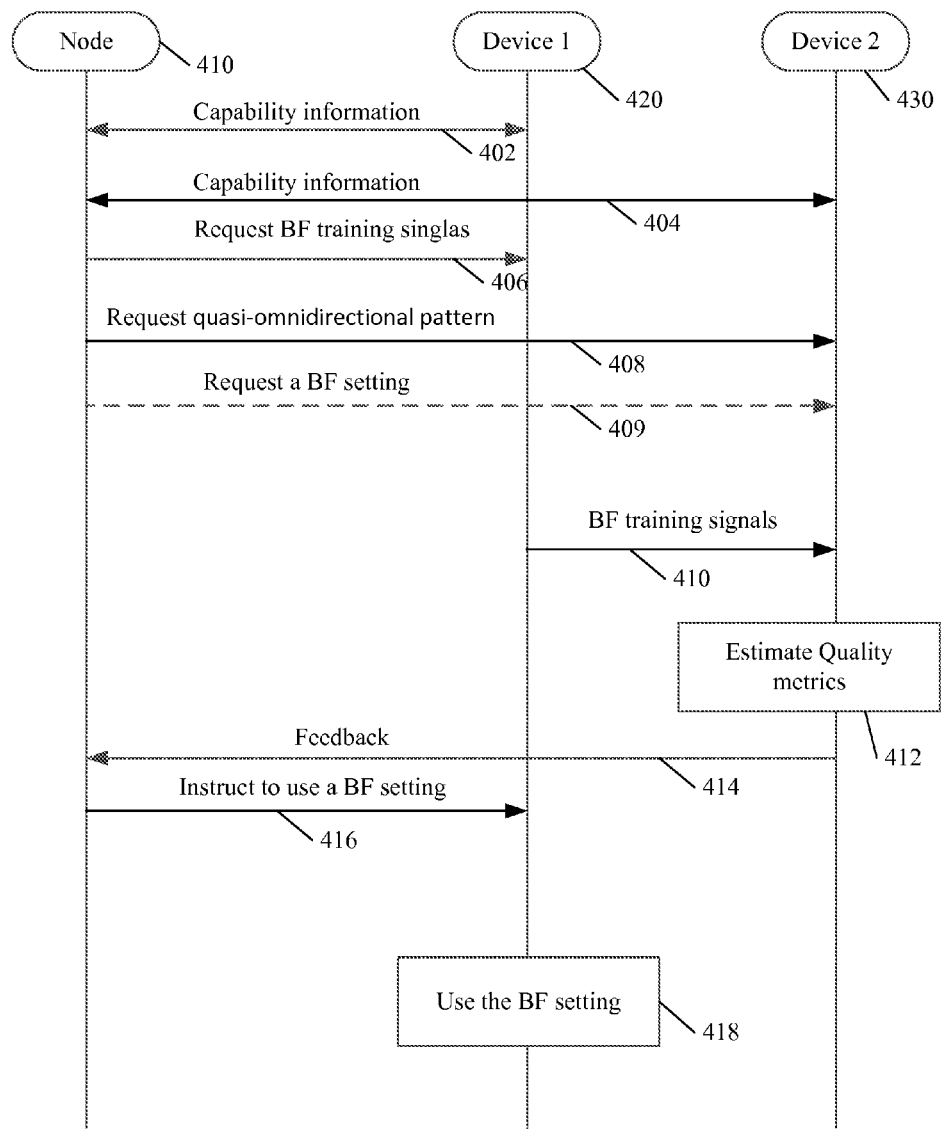
FIG. 4 is a schematic illustration of a sequence of operations between a wireless communication node, a first mobile device and a second mobile device, in accordance with some demonstrative embodiments.

Reference is made to FIG. 4, which schematically illustrates a sequence of operations between a wireless communication node 410, a first mobile device 420 and a second mobile device 430, in accordance with some demonstrative embodiments. For example, wireless communication node 410 may perform the functionality of node 110 (FIG. 1); mobile device 420 may perform the functionality of mobile device 120 (FIG. 1); and/or mobile device 430 may perform the functionality of mobile device 130 (FIG. 1).

As shown in FIG. 4, node 410 and device 420 may communicate capability information 402 over a non-mmWave link to determine whether to establish a mmWave link. For example, node 110 (FIG. 1) and mobile device 120 (FIG. 1) may communicate capability information via link 105 (FIG. 1) to establish link 123 (FIG. 1), e.g., as described above.

As shown in FIG. 4, node 410 and device 430 may communicate capability information 404 over a non-mmWave link to determine to establish a mmWave link. For example, node 110 (FIG. 1) and mobile device 130 (FIG. 1) may communicate capability information via link 135 (FIG. 1) to establish link 123 (FIG. 1), e.g., as described above.

In some demonstrative embodiments, node 410 may determine if devices 420 and 430 are capable of establishing a mmWave link between devices 420 and 430, e.g., based on the capability information. For example, node 110 (FIG. 1) may determine that mobile devices 120 and 130 (FIG. 1) are capable of establishing link 123 (FIG. 1) based on the capability information communicated from mobile device 120 (FIG. 1) via link 105 (FIG. 1), and from mobile device 130 (FIG. 1) via link 135 (FIG. 1), e.g., as described above.

Alternatively, devices 420 and/or 430 may determine that devices 420 and 430 are within a coverage area of each other and are capable of establishing the mmWave link between devices 420 and 430. Devices 420 and/or 430 may inform node 410 over the non-mmWave frequency band that devices 420 and/or 430 are capable of establishing the mmWave link.

As shown in FIG. 4, node 410 may request (406) from device 420 over the non-mmWave link to perform the beamforming training procedure between devices 420 and 430, and to transmit to device 430 mmWave signals, e.g., beamforming training signals, over the mmWave frequency band according to a plurality of different Tx beamforming settings of an antenna, e.g., an antenna array, of device 420. For example, node 110 (FIG. 1) may request mobile device 120 (FIG. 1) to perform the beamforming training procedure to establish link 103 (FIG. 1) and to transmit the beamforming training signals to device 130 (FIG. 1) according to the plurality of different Tx beamforming settings of antennas 128 (FIG. 1), e.g., as described above.

As shown in FIG. 4, node 410 may request (408) from device 430 over the non-mmWave link to configure antennas of device 430, e.g., an antenna array, to apply a quasi-omnidirectional pattern. For example, node 110 (FIG. 1) may request via link 135 from device 130 (FIG. 1) to apply the quasi-omnidirectional pattern to antennas 138 (FIG. 1).

Alternatively, as shown in FIG. 4, node 410 may request (409) mobile device 430 to utilize a beamforming setting of the antenna array of device 430, for example, if the beamforming settings of device 430 are previously configured, and/or a direction of device 420 with respect to mobile device 430 may be known. Accordingly, device 430 may select a most suitable sector and/or beamforming setting for the beamforming training procedure. For example, node 110 (FIG. 1) may request from device 130 (FIG. 1) to configure a beamforming setting of antennas 138 (FIG. 1), for example, if the beamforming settings of antennas 138 (FIG. 1) are previously configured and/or based on the relative location of device 130 (FIG. 1) and device 120 (FIG. 1), e.g., as described above.

As shown in FIG. 4, device 420 may transmit (410) to device 430 mmWave signals, e.g., beamforming training signals, over the mmWave frequency band according to the plurality of different Tx beamforming settings. For example, wireless communication unit 122 (FIG. 1) may transmit to device 130 (FIG. 1) the beamforming training signals according to the plurality of different TX beamforming settings of antennas 128 (FIG. 1).

As shown in FIG. 4, device 430 may receive the beamforming training signals, and may estimate (412) a signal quality metric for each beamforming setting of the different Tx beamforming settings. The signal quality metric may include the RSSI, the SINR, and/or any other quality metric. For example, device 130 (FIG. 1) may receive the beamforming training signals transmitted from device 120 (FIG. 1) and may estimate for each beamforming setting of the different Tx beamforming settings of antennas 128 (FIG. 1) a quality metric, e.g., as described above.

As shown in FIG. 4, device 430 may transmit (414) over the non-mmWave link feedback information to node 410 indicating a beamforming setting of the plurality of Tx beamforming settings of the antennas of mobile device 420. The feedback information may include, for example, an index of a most suitable sector of the antennas of mobile device 420, a most suitable beamforming setting of the antennas of mobile device 420, and/or the quality metrics for each beamforming setting of the different Tx beamforming settings. For example, mobile device 130 (FIG. 1) may transmit via link 135 the feedback information to node 110 (FIG. 1) including the indication of the Tx beamforming setting of antennas 128 (FIG. 1), e.g., as described above.

As shown in FIG. 4, node 410 may instruct (416) device 420 over the non-mmWave link mobile to apply the beamforming setting, e.g., based on the feedback information, when transmitting to device 430 over the mmWave frequency band. For example, node 110 (FIG. 1) may instruct device 120 (FIG. 1) to use the Tx beamforming setting when transmitting to device 130 (FIG. 1) via link 123 (FIG. 1).

As shown in FIG. 4, device 420 may configure the antennas of mobile device 420 according to the beamforming setting, and may use the beamforming setting to transmit to device 430 via the mmWave frequency link. For example, controller 126 (FIG. 1) may control wireless communication unit 122 (FIG. 1) to use the Tx beamforming setting for transmitting to device 130 (FIG. 1) via link 123 (FIG. 1), e.g., as described above.

Figure 5:
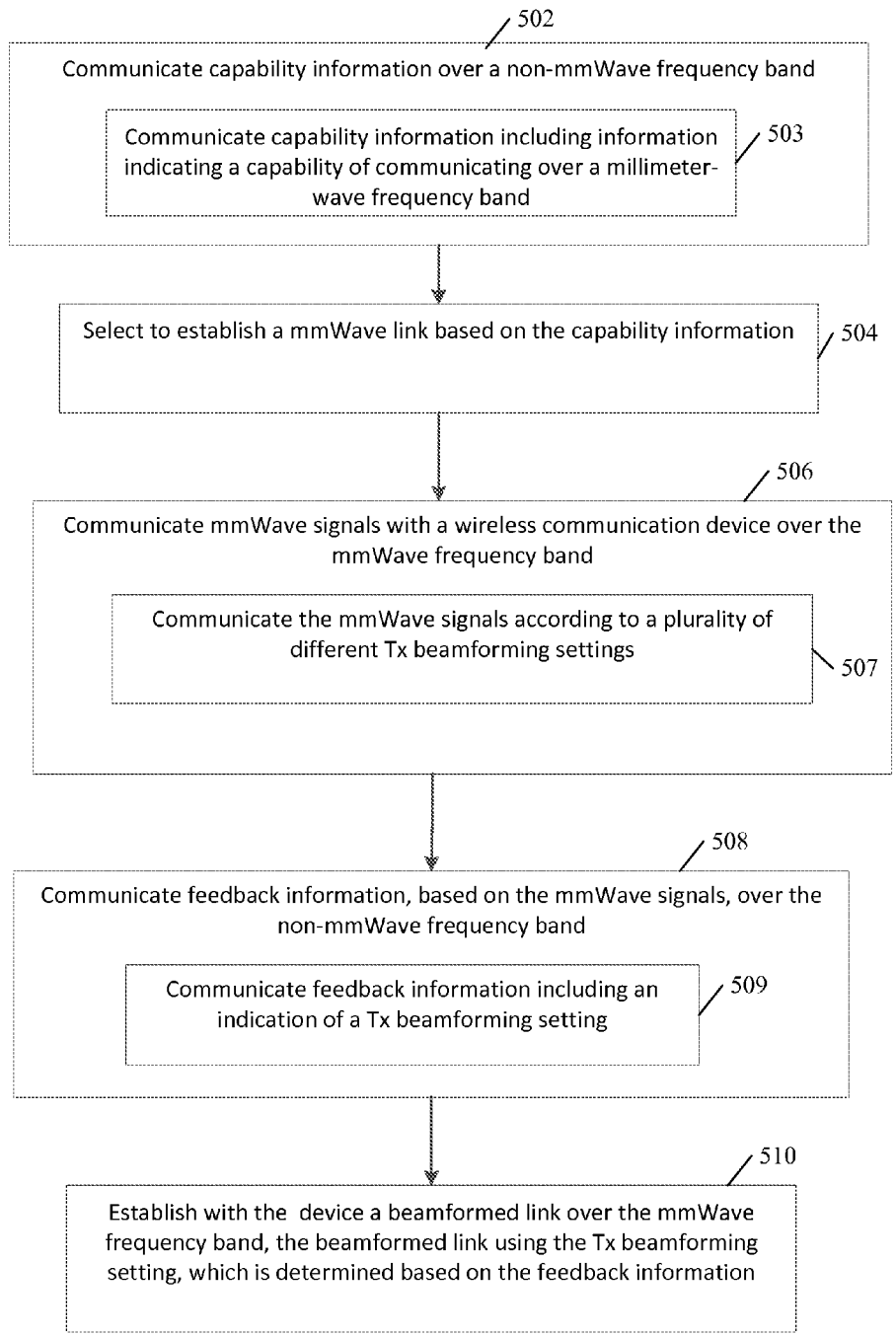
FIG. 5 is a schematic flow-chart illustration of a method of establishing of a wireless beamformed link, in accordance with some demonstrative embodiments.

Reference is now made to FIG. 5, which schematically illustrates a method of establishing a beamformed link, in accordance with some demonstrative embodiments. For example, one or more of the operations of the method of FIG. 5 may be performed by a wireless communication system, e.g., system 100 (FIG. 1); a wireless communication node, e.g., node 110 (FIG. 1); a mobile device, e.g., mobile devices 120 and/or 130, and/or a wireless communication controller, e.g., controllers 116, 126, 136 (FIG. 1).

As indicated at block 502, the method may include communicating capability information over a non-mmWave frequency band. For example, node 110 (FIG. 1) and mobile device 120 (FIG. 1) may communicate capability information over link 105 (FIG. 1), e.g., as described above.

As indicated at block 503, communicating the capability information over the non-mmWave frequency band may include communicating capability information including information indicating a capability of communicating over a millimeter-wave frequency band. For example, node 110 (FIG. 1) and mobile device 120 (FIG. 1) may communicate capability information including information indicating a capability of node 110 (FIG. 1) and/or mobile device 120 (FIG. 1) for communicating over the mmWave frequency band, e.g., as described above.

As indicated at block 504, the method may include selecting to establish a mmWave link based on the capability information. For example, node 110 (FIG. 1) and mobile device 120 (FIG. 1) may establish link 103 (FIG. 1) based on the capability information corresponding to node 110 (FIG. 1) and/or mobile device 120 (FIG. 1), e.g., as described above.

As indicated at block 506, the method may include communicating mmWave signals with a wireless communication device over the mmWave frequency band. For example, wireless communication unit 112 (FIG. 1) may communicate the beamforming training signals with mobile device 120 (FIG. 1) over the mmWave frequency band, e.g., as described above.

As indicated at block 507, communicating the mmWave signals may include communicating the mmWave signals according to a plurality of different Tx beamforming settings. For example, wireless communication unit 112 (FIG. 1) may communicate the beamforming training signals according to the different Tx beamforming settings of antennas 108 (FIG. 1), e.g., as described above.

As indicated at block 508, the method may include communicating feedback information, based on the mmWave signals, over a non-mmWave frequency band. For example, wireless communication unit 124 (FIG. 1) may communicate the feedback information with node 110 (FIG. 1) via link 105 (FIG. 1) based on the beamforming training signals, e.g., as described above As indicated at block 509, communicating the feedback information may include communicating feedback information including an indication of a Tx beamforming setting. For example, wireless communication unit 124 (FIG. 1) may communicate the feedback information including an indication of the selected Tx beamforming setting, e.g., as described above.

Figure 6:
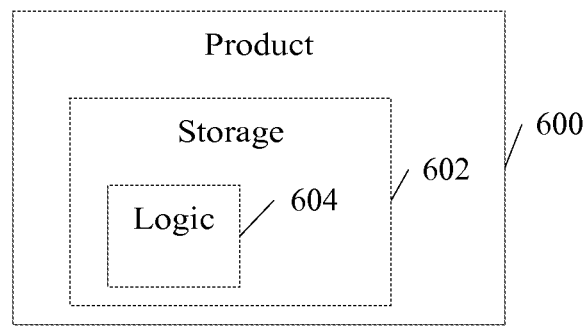
FIG. 6 is a schematic illustration of a product of manufacture, in accordance with some demonstrative embodiments.

As indicated at block 510, the method may include establishing with the wireless communication device a beamformed link over the mmWave frequency band, the beamformed link using the Tx beamforming setting, which is determined based on the feedback information. For example, node 110 (FIG. 1) may establish with mobile device 120 (FIG. 1) link 103 using the Tx beamforming setting based on the feedback information transmitted from mobile device 120 (FIG. 1), e.g., as described above Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of node 110 (FIG. 1), mobile device 120 (FIG. 1), mobile device 130 (FIG. 1), controllers 116, 126 and/or 136 (FIG. 1), and/or to perform one or more operations of the method of FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a wireless communication controller to control a first wireless communication device to communicate millimeter-wave (mmWave) signals with a second wireless communication device over a mmWave frequency band, the mmWave signals including signals transmitted according to a plurality of different transmit (Tx) beamforming settings, said wireless communication controller is to control said first wireless communication device to communicate feedback information, which is based on said mmWave signals, over a non-mmWave frequency band, and to control said first wireless communication device to establish with said second wireless communication device a beamformed link over said mmWave frequency band, said beamformed link using a Tx beamforming setting, which is determined based on the feedback information.

Example 2 includes the subject matter of Example 1 and optionally, wherein said wireless communication controller is to control said first wireless communication device to transmit said mmWave signals according to said plurality of Tx beamforming settings, to receive said feedback information over said non-mmWave frequency band, and to use said Tx beamforming setting for transmitting to said second wireless communication device over said beamformed link.

Example 3 includes the subject matter of Example 1 and optionally, wherein said wireless communication controller is to control said first wireless communication device to receive said mmWave signals, said mmWave signals transmitted by said second wireless communication device according to said plurality of Tx beamforming settings, to transmit said feedback information over said non-mmWave frequency band, and to receive over said beamformed link signals transmitted by said second wireless communication device using said Tx beamforming setting.

Example 4 includes the subject matter of any one of Examples 1-3 and optionally, wherein said feedback information comprises signal quality feedback including one or more signal quality metrics corresponding to said plurality of Tx beamforming settings.

Example 5 includes the subject matter of any one of Examples 1-4 and optionally, wherein said feedback information comprises an indication of said Tx beamforming setting to be used for said beamformed link.

Example 6 includes the subject matter of any one of Examples 1-5 and optionally, wherein said first wireless communication device comprises a base-station (BS), and wherein said second wireless communication device comprises a mobile device.

Example 7 includes the subject matter of Example 6 and optionally, wherein said wireless communication controller is to control said BS to transmit said mmWave signals according to said plurality of Tx beamforming settings, receive said feedback information from said mobile device over said non-mmWave frequency band, and use said Tx beamforming setting for transmitting to said mobile device over said beamformed link.

Example 8 includes the subject matter of Example 6 and optionally, wherein said wireless communication controller is to control said BS to receive said mmWave signals, said mmWave signals including signals transmitted by said mobile device according to said plurality of Tx beamforming settings, and transmit said feedback information to said mobile device over said non-mmWave frequency band, said feedback information including an indication of said Tx beamforming setting.

Example 9 includes the subject matter of any one of Examples 1-5 and optionally, wherein said first wireless communication device comprises a mobile device, and wherein said second wireless communication device comprises a base-station (BS).

Example 10 includes the subject matter of Example 9 and optionally, wherein said wireless communication controller is to control said mobile device to transmit said mmWave signals according to said plurality of Tx beamforming settings, receive said feedback information from said BS over said non-mmWave frequency band, and use said Tx beamforming setting for transmitting to said BS over said beamformed link.

Example 11 includes the subject matter of Example 9 and optionally, wherein said wireless communication controller is to control said mobile device to receive said mmWave signals, said mmWave signals including signals transmitted by said BS according to said plurality of Tx beamforming settings, and transmit said feedback information to said BS over said non-mmWave frequency band.

Example 12 includes the subject matter of any one of Examples 1-5 and optionally, wherein said wireless communication controller is to control a base-station (BS), and wherein said first and second wireless communication devices comprise first and second mobile devices.

Example 13 includes the subject matter of Example 12 and optionally, wherein said wireless communication controller is to control said BS to transmit to said first mobile device over said non-mmWave frequency band an instruction to transmit said mmWave signals according to said plurality of Tx beamforming settings, transmit to said second mobile device over said non-mmWave frequency band an instruction to receive said mmWave signals, receive said feedback information from said second mobile device over said non-mmWave frequency band, and transmit to said first mobile device over said non-mmWave frequency band an instruction to use said Tx beamforming setting for transmitting to said second wireless communication device over said beamformed link.

Example 14 includes the subject matter of any one of Examples 1-13 and optionally, wherein said first and second wireless communication devices comprise first and second mobile devices capable of having direct connectivity over said non-mmWave frequency band.

Example 15 includes the subject matter of any one of Examples 1-14 and optionally, wherein said wireless communication controller is to control said first wireless communication device to communicate said feedback information with said second wireless communication device over said non-mmWave frequency band.

Example 16 includes the subject matter of any one of Examples 1-15 and optionally, wherein said mmWave signals comprise beamforming training signals.

Example 17 includes the subject matter of any one of Examples 1-16 and optionally, wherein said non-mmWave frequency band comprises a broadband cellular frequency band.

Example 18 includes the subject matter of any one of Examples 1-17 and optionally, wherein said non-mmWave frequency band comprises a Long-Term-Evolution (LTE) frequency band.

Example 19 includes the subject matter of any one of Examples 1-18 and optionally, wherein said beamformed link over said mmWave frequency band comprises a Wireless-Gigabit (WiGig) link.

Example 20 includes an apparatus of wireless communication, the apparatus comprising a wireless communication controller to control a first wireless communication device to communicate capability information over a non-millimeter-wave (non-mmWave) frequency band, said capability information including information indicating a capability of communicating between said first wireless communication device and a second wireless communication device over a millimeter-wave (mmWave) frequency band, wherein, based on said capability information, said communication controller is to control said first wireless communication device to establish a mmWave link between said first and second wireless communication devices over said mmWave frequency band.

Example 21 includes the subject matter of Example 20 and optionally, wherein said capability information comprises at least one type of information selected from the group consisting of whether said first wireless communication device includes a mmWave communication module, whether said second wireless communication device includes a mmWave communication module, one or more supported transmission power levels of said first wireless communication device, one or more supported transmission power levels of said second wireless communication device, one or more modulation orders of said first wireless communication device, one or more modulation orders of said second wireless communication device, a number of antennas of said first wireless communication device, a number of antennas of said second wireless communication device, a number of antenna elements per antenna of said first wireless communication device, a number of antenna elements per antenna of said second wireless communication device, a beamforming capability of said first wireless communication device, and a beamforming capability of said second wireless communication device.

Example 22 includes the subject matter of Example 20 or 21 and optionally, wherein said capability information includes location information corresponding to a location of at least one device selected from the group of said first and second wireless communication devices.

Example 23 includes the subject matter of Example 22 and optionally, wherein said communication controller is to control said first wireless communication device to establish said mmWave link based on said location information.

Example 24 includes the subject matter of any one of Examples 20-23 and optionally, wherein said communication controller is to control said first wireless communication device to exchange management and control information corresponding to said mmWave link over said non-mmWave frequency band.

Example 25 includes the subject matter of any one of Examples 20-24 and optionally, wherein said first wireless communication device comprises a base-station (BS), and wherein said second wireless communication device comprises a mobile device.

Example 26 includes the subject matter of any one of Examples 20-24 and optionally, wherein said first wireless communication device comprises a mobile device, and wherein said second wireless communication device comprises a base-station (BS).

Example 27 includes the subject matter of any one of Examples 20-24 and optionally, wherein said wireless communication controller is to control a base-station (BS), and wherein said first and second wireless communication devices comprise first and second mobile devices.

Example 28 includes the subject matter of any one of Examples 20-27 and optionally, wherein said non-mmWave frequency band comprises a broadband cellular frequency band.

Example 29 includes the subject matter of any one of Examples 20-28 and optionally, wherein said non-mmWave frequency band comprises a Long-Term-Evolution (LTE) frequency band.

Example 30 includes the subject matter of any one of Examples 20-29 and optionally, wherein said mmWave link over said mmWave frequency band comprises a Wireless-Gigabit (WiGig) link.

Example 31 includes a system of wireless communication, the system comprising at least one communication device including one or more antennas; a millimeter-wave (mmWave) transceiver to communicate over a mmWave frequency band; a non-mmWave transceiver to communicate over a non-mmWave frequency band; and a wireless communication controller to control a first wireless communication device to communicate mmWave signals with a second wireless communication device over said mmWave frequency band, the mmWave signals including signals transmitted according to a plurality of different transmit (Tx) beamforming settings, said wireless communication controller is to control said first wireless communication device to communicate feedback information, which is based on said mmWave signals, over a non-mmWave frequency band, and to control said first wireless communication device to establish with said second wireless communication device a beamformed link over said mmWave frequency band, said beamformed link using a Tx beamforming setting, which is determined based on the feedback information.

Example 32 includes the subject matter of Example 31 and optionally, wherein said wireless communication controller is to control said first wireless communication device to transmit said mmWave signals according to said plurality of Tx beamforming settings, to receive said feedback information over said non-mmWave frequency band, and to use said Tx beamforming setting for transmitting to said second wireless communication device over said beamformed link.

Example 33 includes the subject matter of Example 31 and optionally, wherein said wireless communication controller is to control said first wireless communication device to receive said mmWave signals, said mmWave signals transmitted by said second wireless communication device according to said plurality of Tx beamforming settings, to transmit said feedback information over said non-mmWave frequency band, and to receive over said beamformed link signals transmitted by said second wireless communication device using said Tx beamforming setting.

Example 34 includes the subject matter of any one of Examples 31-33 and optionally, wherein said feedback information comprises signal quality feedback including one or more signal quality metrics corresponding to said plurality of Tx beamforming settings.

Example 35 includes the subject matter of any one of Examples 31-34 and optionally, wherein said feedback information comprises an indication of said Tx beamforming setting to be used for said beamformed link.

Example 36 includes the subject matter of any one of Examples 31-35 and optionally, wherein said first wireless communication device comprises a base-station (BS), and wherein said second wireless communication device comprises a mobile device.

Example 37 includes the subject matter of Example 36 and optionally, wherein said wireless communication controller is to control said BS to transmit said mmWave signals according to said plurality of Tx beamforming settings, receive said feedback information from said mobile device over said non-mmWave frequency band, and use said Tx beamforming setting for transmitting to said mobile device over said beamformed link.

Example 38 includes the subject matter of Example 36 and optionally, wherein said wireless communication controller is to control said BS to receive said mmWave signals, said mmWave signals including signals transmitted by said mobile device according to said plurality of Tx beamforming settings, and transmit said feedback information to said mobile device over said non-mmWave frequency band, said feedback information including an indication of said Tx beamforming setting.

Example 39 includes the subject matter of any one of Examples 31-35 and optionally, wherein said first wireless communication device comprises a mobile device, and wherein said second wireless communication device comprises a base-station (BS).

Example 40 includes the subject matter of Example 39 and optionally, wherein said wireless communication controller is to control said mobile device to transmit said mmWave signals according to said plurality of Tx beamforming settings, receive said feedback information from said BS over said non-mmWave frequency band, and use said Tx beamforming setting for transmitting to said BS over said beamformed link.

Example 41 includes the subject matter of Example 39 and optionally, wherein said wireless communication controller is to control said mobile device to receive said mmWave signals, said mmWave signals including signals transmitted by said BS according to said plurality of Tx beamforming settings, and transmit said feedback information to said BS over said non-mmWave frequency band.

Example 42 includes the subject matter of any one of Examples 31-35 and optionally, wherein said wireless communication controller is to control a base-station (BS), and wherein said first and second wireless communication devices comprise first and second mobile devices.

Example 43 includes the subject matter of Example 42 and optionally, wherein said wireless communication controller is to control said BS to transmit to said first mobile device over said non-mmWave frequency band an instruction to transmit said mmWave signals according to said plurality of Tx beamforming settings, transmit to said second mobile device over said non-mmWave frequency band an instruction to receive said mmWave signals, receive said feedback information from said second mobile device over said non-mmWave frequency band, and transmit to said first mobile device over said non-mmWave frequency band an instruction to use said Tx beamforming setting for transmitting to said second wireless communication device over said beamformed link.

Example 44 includes the subject matter of any one of Examples 31-43 and optionally, wherein said first and second wireless communication devices comprise first and second mobile devices capable of having direct connectivity over said non-mmWave frequency band.

Example 45 includes the subject matter of any one of Examples 31-44 and optionally, wherein said wireless communication controller is to control said first wireless communication device to communicate said feedback information with said second wireless communication device over said non-mmWave frequency band.

Example 46 includes the subject matter of any one of Examples 31-45 and optionally, wherein said mmWave signals comprise beamforming training signals.

Example 47 includes the subject matter of any one of Examples 31-46 and optionally, wherein said non-mmWave frequency band comprises a broadband cellular frequency band.

Example 48 includes the subject matter of any one of Examples 31-47 and optionally, wherein said non-mmWave frequency band comprises a Long-Term-Evolution (LTE) frequency band.

Example 49 includes the subject matter of any one of Examples 31-48 and optionally, wherein said beamformed link over said mmWave frequency band comprises a Wireless-Gigabit (WiGig) link.

Example 50 includes a system of wireless communication, the system comprising at least one communication device including one or more antennas; a millimeter-wave (mmWave) transceiver to communicate over a mmWave frequency band; a non-mmWave transceiver to communicate over a non-mmWave frequency band; and a wireless communication controller to control a first wireless communication device to communicate capability information over the non-mmWave frequency band, said capability information including information indicating a capability of communicating between said first wireless communication device and a second wireless communication device over the mmWave frequency band, wherein, based on said capability information, said communication controller is to control said first wireless communication device to establish a mmWave link between said first and second wireless communication devices over said mmWave frequency band.

Example 51 includes the subject matter of Example 50 and optionally, wherein said capability information comprises at least one type of information selected from the group consisting of whether said first wireless communication device includes a mmWave communication module, whether said second wireless communication device includes a mmWave communication module, one or more supported transmission power levels of said first wireless communication device, one or more supported transmission power levels of said second wireless communication device, one or more modulation orders of said first wireless communication device, one or more modulation orders of said second wireless communication device, a number of antennas of said first wireless communication device, a number of antennas of said second wireless communication device, a number of antenna elements per antenna of said first wireless communication device, a number of antenna elements per antenna of said second wireless communication device, a beamforming capability of said first wireless communication device, and a beamforming capability of said second wireless communication device.

Example 52 includes the subject matter of Example 50 or 51 and optionally, wherein said capability information includes location information corresponding to a location of at least one device selected from the group of said first and second wireless communication devices.

Example 53 includes the subject matter of Example 52 and optionally, wherein said communication controller is to control said first wireless communication device to establish said mmWave link based on said location information.

Example 54 includes the subject matter of any one of Examples 50-53 and optionally, wherein said communication controller is to control said first wireless communication device to exchange management and control information corresponding to said mmWave link over said non-mmWave frequency band.

Example 55 includes the subject matter of any one of Examples 50-54 and optionally, wherein said first wireless communication device comprises a base-station (BS), and wherein said second wireless communication device comprises a mobile device.

Example 56 includes the subject matter of any one of Examples 50-54 and optionally, wherein said first wireless communication device comprises a mobile device, and wherein said second wireless communication device comprises a base-station (BS).

Example 57 includes the subject matter of any one of Examples 50-54 and optionally, wherein said wireless communication controller is to control a base-station (BS), and wherein said first and second wireless communication devices comprise first and second mobile devices.

Example 58 includes the subject matter of any one of Examples 50-57 and optionally, wherein said non-mmWave frequency band comprises a broadband cellular frequency band.

Example 59 includes the subject matter of any one of Examples 50-58 and optionally, wherein said non-mmWave frequency band comprises a Long-Term-Evolution (LTE) frequency band.

Example 60 includes the subject matter of any one of Examples 50-59 and optionally, wherein said mmWave link over said mmWave frequency band comprises a Wireless-Gigabit (WiGig) link.

Example 61 includes a method of wireless communication, the method comprising causing a first wireless communication device to communicate millimeter-wave (mmWave) signals with a second wireless communication device over a mmWave frequency band, the mmWave signals including signals transmitted according to a plurality of different transmit (Tx) beamforming settings; causing said first wireless communication device to communicate feedback information, which is based on said mmWave signals, over a non-mmWave frequency band; and causing said first wireless communication device to establish with said second wireless communication device a beamformed link over said mmWave frequency band, said beamformed link using a Tx beamforming setting, which is determined based on the feedback information.

Example 62 includes the subject matter of Example 61 and optionally comprising causing said first wireless communication device to transmit said mmWave signals according to said plurality of Tx beamforming settings, to receive said feedback information over said non-mmWave frequency band, and to use said Tx beamforming setting for transmitting to said second wireless communication device over said beamformed link.

Example 63 includes the subject matter of Example 61 and optionally comprising causing said first wireless communication device to receive said mmWave signals, said mmWave signals transmitted by said second wireless communication device according to said plurality of Tx beamforming settings, to transmit said feedback information over said non-mmWave frequency band, and to receive over said beamformed link signals transmitted by said second wireless communication device using said Tx beamforming setting.

Example 64 includes the subject matter of any one of Examples 61-63 and optionally, wherein said feedback information comprises signal quality feedback including one or more signal quality metrics corresponding to said plurality of Tx beamforming settings.

Example 65 includes the subject matter of any one of Examples 61-64 and optionally, wherein said feedback information comprises an indication of said Tx beamforming setting to be used for said beamformed link.

Example 66 includes the subject matter of any one of Examples 61-65 and optionally, wherein said first wireless communication device comprises a base-station (BS), and wherein said second wireless communication device comprises a mobile device.

Example 67 includes the subject matter of Example 66 and optionally comprising causing said BS to transmit said mmWave signals according to said plurality of Tx beamforming settings, receive said feedback information from said mobile device over said non-mmWave frequency band, and use said Tx beamforming setting for transmitting to said mobile device over said beamformed link.

Example 68 includes the subject matter of Example 66 and optionally comprising causing said BS to receive said mmWave signals, said mmWave signals including signals transmitted by said mobile device according to said plurality of Tx beamforming settings, and transmit said feedback information to said mobile device over said non-mmWave frequency band, said feedback information including an indication of said Tx beamforming setting.

Example 69 includes the subject matter of any one of Examples 61-65 and optionally, wherein said first wireless communication device comprises a mobile device, and wherein said second wireless communication device comprises a base-station (BS).

Example 70 includes the subject matter of Example 69 and optionally comprising causing said mobile device to transmit said mmWave signals according to said plurality of Tx beamforming settings, receive said feedback information from said BS over said non-mmWave frequency band, and use said Tx beamforming setting for transmitting to said BS over said beamformed link.

Example 71 includes the subject matter of Example 69 and optionally comprising causing said mobile device to receive said mmWave signals, said mmWave signals including signals transmitted by said BS according to said plurality of Tx beamforming settings, and transmit said feedback information to said BS over said non-mmWave frequency band.

Example 72 includes the subject matter of any one of Examples 61-65 and optionally comprising controlling a base-station (BS), and wherein said first and second wireless communication devices comprise first and second mobile devices.

Example 73 includes the subject matter of Example 72 and optionally comprising causing said BS to transmit to said first mobile device over said non-mmWave frequency band an instruction to transmit said mmWave signals according to said plurality of Tx beamforming settings, transmit to said second mobile device over said non-mmWave frequency band an instruction to receive said mmWave signals, receive said feedback information from said second mobile device over said non-mmWave frequency band, and transmit to said first mobile device over said non-mmWave frequency band an instruction to use said Tx beamforming setting for transmitting to said second wireless communication device over said beamformed link.

Example 74 includes the subject matter of any one of Examples 61-73 and optionally, wherein said first and second wireless communication devices comprise first and second mobile devices capable of having direct connectivity over said non-mmWave frequency band.

Example 75 includes the subject matter of any one of Examples 61-74 and optionally comprising controlling said first wireless communication device to communicate said feedback information with said second wireless communication device over said non-mmWave frequency band.

Example 76 includes the subject matter of any one of Examples 61-75 and optionally, wherein said mmWave signals comprise beamforming training signals.

Example 77 includes the subject matter of any one of Examples 61-76 and optionally, wherein said non-mmWave frequency band comprises a broadband cellular frequency band.

Example 78 includes the subject matter of any one of Examples 61-77 and optionally, wherein said non-mmWave frequency band comprises a Long-Term-Evolution (LTE) frequency band.

Example 79 includes the subject matter of any one of Examples 61-78 and optionally, wherein said beamformed link over said mmWave frequency band comprises a Wireless-Gigabit (WiGig) link.

Example 80 includes a method of wireless communication, the method comprising causing a first wireless communication device to communicate capability information over a non-millimeter-wave (non-mmWave) frequency band, said capability information including information indicating a capability of communicating between said first wireless communication device and a second wireless communication device over a millimeter-wave (mmWave) frequency band; and causing said first wireless communication device to establish a mmWave link between said first and second wireless communication devices over said mmWave frequency band based on said capability information.

Example 81 includes the subject matter of Example 80 and optionally, wherein said capability information comprises at least one type of information selected from the group consisting of whether said first wireless communication device includes a mmWave communication module, whether said second wireless communication device includes a mmWave communication module, one or more supported transmission power levels of said first wireless communication device, one or more supported transmission power levels of said second wireless communication device, one or more modulation orders of said first wireless communication device, one or more modulation orders of said second wireless communication device, a number of antennas of said first wireless communication device, a number of antennas of said second wireless communication device, a number of antenna elements per antenna of said first wireless communication device, a number of antenna elements per antenna of said second wireless communication device, a beamforming capability of said first wireless communication device, and a beamforming capability of said second wireless communication device.

Example 82 includes the subject matter of Example 80 or 81 and optionally, wherein said capability information includes location information corresponding to a location of at least one device selected from the group of said first and second wireless communication devices.

Example 83 includes the subject matter of Example 82 and optionally comprising controlling said first wireless communication device to establish said mmWave link based on said location information.

Example 84 includes the subject matter of any one of Examples 80-83 and optionally comprising controlling said first wireless communication device to exchange management and control information corresponding to said mmWave link over said non-mmWave frequency band.

Example 85 includes the subject matter of any one of Examples 80-84 and optionally, wherein said first wireless communication device comprises a base-station (BS), and wherein said second wireless communication device comprises a mobile device.

Example 86 includes the subject matter of any one of Examples 80-84 and optionally, wherein said first wireless communication device comprises a mobile device, and wherein said second wireless communication device comprises a base-station (BS).

Example 87 includes the subject matter of any one of Examples 80-84 and optionally comprising controlling a base-station (BS), and wherein said first and second wireless communication devices comprise first and second mobile devices.

Example 88 includes the subject matter of any one of Examples 80-87 and optionally, wherein said non-mmWave frequency band comprises a broadband cellular frequency band.

Example 89 includes the subject matter of any one of Examples 80-88 and optionally, wherein said non-mmWave frequency band comprises a Long-Term-Evolution (LTE) frequency band.

Example 90 includes the subject matter of any one of Examples 80-89 and optionally, wherein said mmWave link over said mmWave frequency band comprises a Wireless-Gigabit (WiGig) link.

Example 91 includes a product including a non-transitory storage medium having stored thereon instructions that, when executed by a machine, result in causing a first wireless communication device to communicate millimeter-wave (mmWave) signals with a second wireless communication device over a mmWave frequency band, the mmWave signals including signals transmitted according to a plurality of different transmit (Tx) beamforming settings; causing said first wireless communication device to communicate feedback information, which is based on said mmWave signals, over a non-mmWave frequency band; and causing said first wireless communication device to establish with said second wireless communication device a beamformed link over said mmWave frequency band, said beamformed link using a Tx beamforming setting, which is determined based on the feedback information.

Example 92 includes the subject matter of Example 91 and optionally, wherein said instructions result in causing said first wireless communication device to transmit said mmWave signals according to said plurality of Tx beamforming settings, to receive said feedback information over said non-mmWave frequency band, and to use said Tx beamforming setting for transmitting to said second wireless communication device over said beamformed link.

Example 93 includes the subject matter of Example 91 and optionally, wherein said instructions result in causing said first wireless communication device to receive said mmWave signals, said mmWave signals transmitted by said second wireless communication device according to said plurality of Tx beamforming settings, to transmit said feedback information over said non-mmWave frequency band, and to receive over said beamformed link signals transmitted by said second wireless communication device using said Tx beamforming setting.

Example 94 includes the subject matter of any one of Examples 91-93 and optionally, wherein said feedback information comprises signal quality feedback including one or more signal quality metrics corresponding to said plurality of Tx beamforming settings.

Example 95 includes the subject matter of any one of Examples 91-94 and optionally, wherein said feedback information comprises an indication of said Tx beamforming setting to be used for said beamformed link.

Example 96 includes the subject matter of any one of Examples 91-95 and optionally, wherein said first wireless communication device comprises a base-station (BS), and wherein said second wireless communication device comprises a mobile device.

Example 97 includes the subject matter of Example 96 and optionally, wherein said instructions result in causing said BS to transmit said mmWave signals according to said plurality of Tx beamforming settings, receive said feedback information from said mobile device over said non-mmWave frequency band, and use said Tx beamforming setting for transmitting to said mobile device over said beamformed link.

Example 98 includes the subject matter of Example 96 and optionally, wherein said instructions result in causing said BS to receive said mmWave signals, said mmWave signals including signals transmitted by said mobile device according to said plurality of Tx beamforming settings, and transmit said feedback information to said mobile device over said non-mmWave frequency band, said feedback information including an indication of said Tx beamforming setting.

Example 99 includes the subject matter of any one of Examples 91-95 and optionally, wherein said first wireless communication device comprises a mobile device, and wherein said second wireless communication device comprises a base-station (BS).

Example 100 includes the subject matter of Example 99 and optionally, wherein said instructions result in causing said mobile device to transmit said mmWave signals according to said plurality of Tx beamforming settings, receive said feedback information from said BS over said non-mmWave frequency band, and use said Tx beamforming setting for transmitting to said BS over said beamformed link.

Example 101 includes the subject matter of Example 99 and optionally, wherein said instructions result in causing said mobile device to receive said mmWave signals, said mmWave signals including signals transmitted by said BS according to said plurality of Tx beamforming settings, and transmit said feedback information to said BS over said non-mmWave frequency band.

Example 102 includes the subject matter of any one of Examples 91-95 and optionally, wherein said instructions result in controlling a base-station (BS), and wherein said first and second wireless communication devices comprise first and second mobile devices.

Example 103 includes the subject matter of Example 102 and optionally, wherein said instructions result in causing said BS to transmit to said first mobile device over said non-mmWave frequency band an instruction to transmit said mmWave signals according to said plurality of Tx beamforming settings, transmit to said second mobile device over said non-mmWave frequency band an instruction to receive said mmWave signals, receive said feedback information from said second mobile device over said non-mmWave frequency band, and transmit to said first mobile device over said non-mmWave frequency band an instruction to use said Tx beamforming setting for transmitting to said second wireless communication device over said beamformed link.

Example 104 includes the subject matter of any one of Examples 91-103 and optionally, wherein said first and second wireless communication devices comprise first and second mobile devices capable of having direct connectivity over said non-mmWave frequency band.

Example 105 includes the subject matter of any one of Examples 91-104 and optionally, wherein said instructions result in controlling said first wireless communication device to communicate said feedback information with said second wireless communication device over said non-mmWave frequency band.

Example 106 includes the subject matter of any one of Examples 91-105 and optionally, wherein said mmWave signals comprise beamforming training signals.

Example 107 includes the subject matter of any one of Examples 91-106 and optionally, wherein said non-mmWave frequency band comprises a broadband cellular frequency band.

Example 108 includes the subject matter of any one of Examples 91-107 and optionally, wherein said non-mmWave frequency band comprises a Long-Term-Evolution (LTE) frequency band.

Example 109 includes the subject matter of any one of Examples 91-108 and optionally, wherein said beamformed link over said mmWave frequency band comprises a Wireless-Gigabit (WiGig) link.

Example 110 includes a product including a non-transitory storage medium having stored thereon instructions that, when executed by a machine, result in causing a first wireless communication device to communicate capability information over a non-millimeter-wave (non-mmWave) frequency band, said capability information including information indicating a capability of communicating between said first wireless communication device and a second wireless communication device over a millimeter-wave (mmWave) frequency band; and causing said first wireless communication device to establish a mmWave link between said first and second wireless communication devices over said mmWave frequency band based on said capability information.

Example 111 includes the subject matter of Example 110 and optionally, wherein said capability information comprises at least one type of information selected from the group consisting of whether said first wireless communication device includes a mmWave communication module, whether said second wireless communication device includes a mmWave communication module, one or more supported transmission power levels of said first wireless communication device, one or more supported transmission power levels of said second wireless communication device, one or more modulation orders of said first wireless communication device, one or more modulation orders of said second wireless communication device, a number of antennas of said first wireless communication device, a number of antennas of said second wireless communication device, a number of antenna elements per antenna of said first wireless communication device, a number of antenna elements per antenna of said second wireless communication device, a beamforming capability of said first wireless communication device, and a beamforming capability of said second wireless communication device.

Example 112 includes the subject matter of Example 110 or 111 and optionally, wherein said capability information includes location information corresponding to a location of at least one device selected from the group of said first and second wireless communication devices.

Example 113 includes the subject matter of Example 112 and optionally, wherein said instructions result in controlling said first wireless communication device to establish said mmWave link based on said location information.

Example 114 includes the subject matter of any one of Examples 110-113 and optionally, wherein said instructions result in controlling said first wireless communication device to exchange management and control information corresponding to said mmWave link over said non-mmWave frequency band.

Example 115 includes the subject matter of any one of Examples 110-114 and optionally, wherein said first wireless communication device comprises a base-station (BS), and wherein said second wireless communication device comprises a mobile device.

Example 116 includes the subject matter of any one of Examples 110-114 and optionally, wherein said first wireless communication device comprises a mobile device, and wherein said second wireless communication device comprises a base-station (BS).

Example 117 includes the subject matter of any one of Examples 110-114 and optionally, wherein said instructions result in controlling a base-station (BS), and wherein said first and second wireless communication devices comprise first and second mobile devices.

Example 118 includes the subject matter of any one of Examples 110-117 and optionally, wherein said non-mmWave frequency band comprises a broadband cellular frequency band.

Example 119 includes the subject matter of any one of Examples 110-118 and optionally, wherein said non-mmWave frequency band comprises a Long-Term-Evolution (LTE) frequency band.

Example 120 includes the subject matter of any one of Examples 110-119 and optionally, wherein said beamformed link over said mmWave frequency band comprises a Wireless-Gigabit (WiGig) link.

Example 121 includes an apparatus of wireless communication, the apparatus comprising means for causing a first wireless communication device to communicate millimeter-wave (mmWave) signals with a second wireless communication device over a mmWave frequency band, the mmWave signals including signals transmitted according to a plurality of different transmit (Tx) beamforming settings; means for causing said first wireless communication device to communicate feedback information, which is based on said mmWave signals, over a non-mmWave frequency band; and means for causing said first wireless communication device to establish with said second wireless communication device a beamformed link over said mmWave frequency band, said beamformed link using a Tx beamforming setting, which is determined based on the feedback information.

Example 122 includes the subject matter of Example 121 and optionally comprising means for causing said first wireless communication device to transmit said mmWave signals according to said plurality of Tx beamforming settings, to receive said feedback information over said non-mmWave frequency band, and to use said Tx beamforming setting for transmitting to said second wireless communication device over said beamformed link.

Example 123 includes the subject matter of Example 121 and optionally comprising means for causing said first wireless communication device to receive said mmWave signals, said mmWave signals transmitted by said second wireless communication device according to said plurality of Tx beamforming settings, to transmit said feedback information over said non-mmWave frequency band, and to receive over said beamformed link signals transmitted by said second wireless communication device using said Tx beamforming setting.

Example 124 includes the subject matter of any one of Examples 121-123 and optionally, wherein said feedback information comprises signal quality feedback including one or more signal quality metrics corresponding to said plurality of Tx beamforming settings.

Example 125 includes the subject matter of any one of Examples 121-124 and optionally, wherein said feedback information comprises an indication of said Tx beamforming setting to be used for said beamformed link.

Example 126 includes the subject matter of any one of Examples 121-125 and optionally, wherein said first wireless communication device comprises a base-station (BS), and wherein said second wireless communication device comprises a mobile device.

Example 127 includes the subject matter of Example 126 and optionally comprising means for causing said BS to transmit said mmWave signals according to said plurality of Tx beamforming settings, receive said feedback information from said mobile device over said non-mmWave frequency band, and use said Tx beamforming setting for transmitting to said mobile device over said beamformed link.

Example 128 includes the subject matter of Example 126 and optionally comprising means for causing said BS to receive said mmWave signals, said mmWave signals including signals transmitted by said mobile device according to said plurality of Tx beamforming settings, and transmit said feedback information to said mobile device over said non-mmWave frequency band, said feedback information including an indication of said Tx beamforming setting.

Example 129 includes the subject matter of any one of Examples 121-125 and optionally, wherein said first wireless communication device comprises a mobile device, and wherein said second wireless communication device comprises a base-station (BS).

Example 130 includes the subject matter of Example 129 and optionally comprising means for causing said mobile device to transmit said mmWave signals according to said plurality of Tx beamforming settings, receive said feedback information from said BS over said non-mmWave frequency band, and use said Tx beamforming setting for transmitting to said BS over said beamformed link.

Example 131 includes the subject matter of Example 129 and optionally comprising means for causing said mobile device to receive said mmWave signals, said mmWave signals including signals transmitted by said BS according to said plurality of Tx beamforming settings, and transmit said feedback information to said BS over said non-mmWave frequency band.

Example 132 includes the subject matter of any one of Examples 121-125 and optionally comprising means for controlling a base-station (BS), and wherein said first and second wireless communication devices comprise first and second mobile devices.

Example 133 includes the subject matter of Example 132 and optionally comprising means for causing said BS to transmit to said first mobile device over said non-mmWave frequency band an instruction to transmit said mmWave signals according to said plurality of Tx beamforming settings, transmit to said second mobile device over said non-mmWave frequency band an instruction to receive said mmWave signals, receive said feedback information from said second mobile device over said non-mmWave frequency band, and transmit to said first mobile device over said non-mmWave frequency band an instruction to use said Tx beamforming setting for transmitting to said second wireless communication device over said beamformed link.

Example 134 includes the subject matter of any one of Examples 121-133 and optionally, wherein said first and second wireless communication devices comprise first and second mobile devices capable of having direct connectivity over said non-mmWave frequency band.

Example 135 includes the subject matter of any one of Examples 121-134 and optionally comprising means for controlling said first wireless communication device to communicate said feedback information with said second wireless communication device over said non-mmWave frequency band.

Example 136 includes the subject matter of any one of Examples 121-135 and optionally, wherein said mmWave signals comprise beamforming training signals.

Example 137 includes the subject matter of any one of Examples 121-136 and optionally, wherein said non-mmWave frequency band comprises a broadband cellular frequency band.

Example 138 includes the subject matter of any one of Examples 121-137 and optionally, wherein said non-mmWave frequency band comprises a Long-Term-Evolution (LTE) frequency band.

Example 139 includes the subject matter of any one of Examples 121-138 and optionally, wherein said beamformed link over said mmWave frequency band comprises a Wireless-Gigabit (WiGig) link.

Example 140 includes an apparatus of wireless communication, the apparatus comprising means for causing a first wireless communication device to communicate capability information over a non-millimeter-wave (non-mmWave) frequency band, said capability information including information indicating a capability of communicating between said first wireless communication device and a second wireless communication device over a millimeter-wave (mmWave) frequency band; and means for causing said first wireless communication device to establish a mmWave link between said first and second wireless communication devices over said mmWave frequency band based on said capability information.

Example 141 includes the subject matter of Example 140 and optionally, wherein said capability information comprises at least one type of information selected from the group consisting of whether said first wireless communication device includes a mmWave communication module, whether said second wireless communication device includes a mmWave communication module, one or more supported transmission power levels of said first wireless communication device, one or more supported transmission power levels of said second wireless communication device, one or more modulation orders of said first wireless communication device, one or more modulation orders of said second wireless communication device, a number of antennas of said first wireless communication device, a number of antennas of said second wireless communication device, a number of antenna elements per antenna of said first wireless communication device, a number of antenna elements per antenna of said second wireless communication device, a beamforming capability of said first wireless communication device, and a beamforming capability of said second wireless communication device.

Example 142 includes the subject matter of Example 140 or 141 and optionally, wherein said capability information includes location information corresponding to a location of at least one device selected from the group of said first and second wireless communication devices.

Example 143 includes the subject matter of any one of Examples 142 and optionally comprising means for controlling said first wireless communication device to establish said mmWave link based on said location information.

Example 144 includes the subject matter of any one of Examples 140-143 and optionally comprising means for controlling said first wireless communication device to exchange management and control information corresponding to said mmWave link over said non-mmWave frequency band.

Example 145 includes the subject matter of any one of Examples 140-144 and optionally, wherein said first wireless communication device comprises a base-station (BS), and wherein said second wireless communication device comprises a mobile device.

Example 146 includes the subject matter of any one of Examples 140-144 and optionally, wherein said first wireless communication device comprises a mobile device, and wherein said second wireless communication device comprises a base-station (BS).

Example 147 includes the subject matter of any one of Examples 140-144 and optionally comprising means for controlling a base-station (BS), and wherein said first and second wireless communication devices comprise first and second mobile devices.

Example 148 includes the subject matter of any one of Examples 140-147 and optionally, wherein said non-mmWave frequency band comprises a broadband cellular frequency band.

Example 149 includes the subject matter of any one of Examples 140-148 and optionally, wherein said non-mmWave frequency band comprises a Long-Term-Evolution (LTE) frequency band.

Example 150 includes the subject matter of any one of Examples 140-149 and optionally, wherein said mmWave link over said mmWave frequency band comprises a Wireless-Gigabit (WiGig) link.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a wireless communication controller to control a first wireless communication device to communicate millimeter-wave (mmWave) signals with a second wireless communication device over a mmWave frequency band, the mmWave signals including signals transmitted according to a plurality of different transmit (Tx) beamforming settings, said wireless communication controller is to control said first wireless communication device to communicate feedback information, which is based on said mmWave signals, over a non-mmWave frequency band, and to control said first wireless communication device to establish with said second wireless communication device a beamformed link over said mmWave frequency band, said beamformed link using a Tx beamforming setting, which is determined based on the feedback information.

2. The apparatus of claim 1, wherein said wireless communication controller is to control said first wireless communication device to transmit said mmWave signals according to said plurality of Tx beamforming settings, to receive said feedback information over said non-mmWave frequency band, and to use said Tx beamforming setting for transmitting to said second wireless communication device over said beamformed link.

3. The apparatus of claim 1, wherein said wireless communication controller is to control said first wireless communication device to receive said mmWave signals, said mmWave signals transmitted by said second wireless communication device according to said plurality of Tx beamforming settings, to transmit said feedback information over said non-mmWave frequency band, and to receive over said beamformed link signals transmitted by said second wireless communication device using said Tx beamforming setting.

4. The apparatus of claim 1, wherein said feedback information comprises signal quality feedback including one or more signal quality metrics corresponding to said plurality of Tx beamforming settings.

5. The apparatus of claim 1, wherein said feedback information comprises an indication of said Tx beamforming setting to be used for said beamformed link.

6. The apparatus of claim 1, wherein said first wireless communication device comprises a base-station (BS), and wherein said second wireless communication device comprises a mobile device.

7. The apparatus of claim 6, wherein said wireless communication controller is to control said BS to:
transmit said mmWave signals according to said plurality of Tx beamforming settings,
receive said feedback information from said mobile device over said non-mmWave frequency band,
and use said Tx beamforming setting for transmitting to said mobile device over said beamformed link.

8. The apparatus of claim 6, wherein said wireless communication controller is to control said BS to:
receive said mmWave signals, said mmWave signals including signals transmitted by said mobile device according to said plurality of Tx beamforming settings,
and transmit said feedback information to said mobile device over said non-mmWave frequency band, said feedback information including an indication of said Tx beamforming setting.

9. The apparatus of claim 1, wherein said first wireless communication device comprises a mobile device, and wherein said second wireless communication device comprises a base-station (BS).

10. The apparatus of claim 9, wherein said wireless communication controller is to control said mobile device to:
transmit said mmWave signals according to said plurality of Tx beamforming settings,
receive said feedback information from said BS over said non-mmWave frequency band,
and use said Tx beamforming setting for transmitting to said BS over said beamformed link.

11. The apparatus of claim 9, wherein said wireless communication controller is to control said mobile device to:
receive said mmWave signals, said mmWave signals including signals transmitted by said BS according to said plurality of Tx beamforming settings,
and transmit said feedback information to said BS over said non-mmWave frequency band.

12. The apparatus of claim 1, wherein said wireless communication controller is to control a base-station (BS), and wherein said first and second wireless communication devices comprise first and second mobile devices.

13. The apparatus of claim 12, wherein said wireless communication controller is to control said BS to:

transmit to said first mobile device over said non-mmWave frequency band an instruction to transmit said mmWave signals according to said plurality of Tx beamforming settings, transmit to said second mobile device over said non-mmWave frequency band an instruction to receive said mmWave signals, receive said feedback information from said second mobile device over said non-mmWave frequency band, and transmit to said first mobile device over said non-mmWave frequency band an instruction to use said Tx beamforming setting for transmitting to said second wireless communication device over said beamformed link.

14. The apparatus of claim 1, wherein said first and second wireless communication devices comprise first and second mobile devices capable of having direct connectivity over said non-mmWave frequency band.

15. The apparatus of claim 1, wherein said wireless communication controller is to control said first wireless communication device to communicate said feedback information with said second wireless communication device over said non-mmWave frequency band.

16. The apparatus of claim 1, wherein said mmWave signals comprise beamforming training signals.

17. The apparatus of claim 1, wherein said non-mmWave frequency band comprises a broadband cellular frequency band.

18. The apparatus of claim 1, wherein said non-mmWave frequency band comprises a Long-Term-Evolution (LTE) frequency band.

19. The apparatus of claim 1, wherein said beamformed link over said mmWave frequency band comprises a Wireless-Gigabit (WiGig) link.

20. A product including a non-transitory storage medium having stored thereon instructions that, when executed by a machine, result in:

causing a first wireless communication device to communicate millimeter-wave (mmWave) signals with a second wireless communication device over a mmWave frequency band, the mmWave signals including signals transmitted according to a plurality of different transmit (Tx) beamforming settings;

causing said first wireless communication device to communicate feedback information, which is based on said mmWave signals, over a non-mmWave frequency band; and causing said first wireless communication device to establish with said second wireless communication device a beamformed link over said mmWave frequency band, said beamformed link using a Tx beamforming setting, which is determined based on the feedback information.

21. The product of claim 20, wherein said instructions result in causing said first wireless communication device to transmit said mmWave signals according to said plurality of Tx beamforming settings, to receive said feedback information over said non-mmWave frequency band, and to use said Tx beamforming setting for transmitting to said second wireless communication device over said beamformed link.

22. The product of claim 20, wherein said instructions result in causing said first wireless communication device to receive said mmWave signals, said mmWave signals transmitted by said second wireless communication device according to said plurality of Tx beamforming settings, to transmit said feedback information over said non-mmWave frequency band, and to receive over said beamformed link signals transmitted by said second wireless communication device using said Tx beamforming setting.

* * * * *